US012808335B2

(12) United States Patent
Minas

(10) Patent No.: US 12,808,335 B2
(45) Date of Patent: Nov. 24, 2026

(54) HYDROGEN-BASED FUEL DISTRIBUTION SYSTEMS USING A SUBMERGED PUMP AND COMPRESSED NATURAL GAS

(71) Applicant: General Electric Company, Schenectady, NY (US)

(72) Inventor: Constantinos Minas, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 911 days.

(21) Appl. No.: 17/727,429

(22) Filed: Apr. 22, 2022

(65) Prior Publication Data

US 2023/0340913 A1 Oct. 26, 2023

(51) Int. Cl.

*F02C 9/40* (2006.01)
*B64D 37/30* (2006.01)
*F02C 3/22* (2006.01)

(52) U.S. Cl.

CPC ................ *F02C 9/40* (2013.01); *B64D 37/30* (2013.01); *F02C 3/22* (2013.01); *F05D 2270/80* (2013.01)

(58) Field of Classification Search

CPC .................................. F02C 9/40; B64D 37/30
See application file for complete search history.

(56) References Cited

U.S. PATENT DOCUMENTS

| | | | | |
|---|---|---|---|---|
| 7,546,834 B1 | 6/2009 | Ulrey et al. | | |
| 9,954,414 B2 | 4/2018 | Cunningham et al. | | |
| 12,017,789 B2 | 6/2024 | Minas et al. | | |
| 12,092,042 B2 | 9/2024 | Minas et al. | | |
| 2011/0101166 A1* | 5/2011 | Schwarze | F02C 9/40 | 244/135 R |
| 2014/0026597 A1* | 1/2014 | Epstein | F17C 13/005 | 62/53.2 |
| 2015/0344144 A1 | 12/2015 | Kamath et al. | | |
| 2023/0092811 A1* | 3/2023 | Palmer | F02C 3/22 | 60/39.281 |
| 2023/0122350 A1* | 4/2023 | Minas | F02C 7/224 | 60/39.281 |
| 2024/0401518 A1 | 12/2024 | Minas | | |

FOREIGN PATENT DOCUMENTS

| | | |
|---|---|---|
| CN | 105074167 A | 11/2015 |
| CN | 109026710 | 12/2018 |
| JP | 2007024015 | 2/2007 |
| JP | 2014084825 | 5/2014 |

(Continued)

*Primary Examiner* — Katheryn A Malatek
(74) *Attorney, Agent, or Firm* — Hanley, Flight & Zimmerman, LLC

(57) ABSTRACT

Methods and apparatus are disclosed for a hydrogen-based fuel distribution system using a submerged pump and compressed natural gas. An example fuel distribution system includes a gaseous hydrogen fuel tank for holding a first portion of hydrogen fuel in a gaseous phase as part of a gaseous hydrogen delivery assembly, and a liquid hydrogen fuel tank for holding a second portion of hydrogen fuel in a liquid phase as part of a liquid hydrogen delivery assembly, the liquid hydrogen fuel tank including a primary tank and a secondary tank, the secondary tank including a submerged pump, wherein the gaseous hydrogen fuel tank and the liquid hydrogen fuel tank are in a parallel arrangement.

17 Claims, 11 Drawing Sheets

(56) References Cited

FOREIGN PATENT DOCUMENTS

| | | | |
|---|---|---|---|
| JP | 2018131944 | | 8/2018 |
| KR | 20200005270 | A | 1/2020 |
| WO | 2005124246 | | 12/2005 |
| WO | 2009018898 | | 2/2009 |
| WO | 2017013519 | | 1/2017 |
| WO | 2020013085 | A1 | 1/2020 |

* cited by examiner

HYDROGEN-BASED FUEL DISTRIBUTION SYSTEMS USING A SUBMERGED PUMP AND COMPRESSED NATURAL GAS

FIELD OF THE DISCLOSURE

This disclosure relates generally to fuel distribution systems, and, more particularly, to a hydrogen-based fuel distribution systems using a submerged pump and compressed natural gas.

BACKGROUND

Aircraft fuel distribution systems support fuel storage and fuel distribution to an engine. In some examples, a fuel system can include a single, gravity feed fuel tank with an associated fuel line connecting the tank to the aircraft engine. In some examples, multiple fuel tanks can be present as part of the fuel distribution system. The one or more tank(s) can be located in a wing, a fuselage, and/or in a tail of the aircraft. The tank(s) can be connected to internal fuel pump(s) with associated valve(s) and/or plumbing to permit feeding of the engine, refueling, defueling, individual tank isolation, and/or overall optimization of an aircraft's center of gravity.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

FIG. TA illustrates an example positioning of a hydrogen-based fuel distribution system in an aircraft.

Figure 1A:
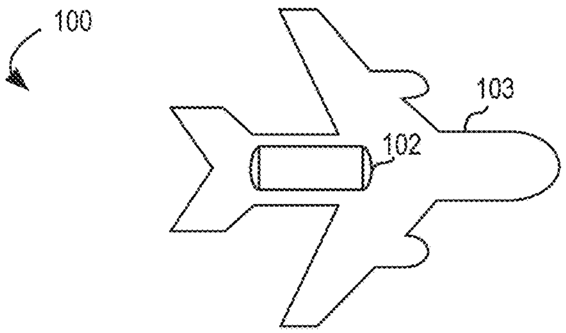
FIG. 1B schematically illustrates a known system for combustor start-up using a tank supplying liquid hydrogen to a hydrogen-based fuel distribution system.
FIG. 1C schematically illustrates a known system for combustor start-up using a tank bank supplying gaseous hydrogen to a hydrogen-based fuel distribution system.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

DETAILED DESCRIPTION

Hydrogen-based systems can be used to power aircraft and/or turbines. For aircraft-based usage, hydrogen can be stored as pressurized gas or in liquid form. Liquid hydrogen (LH2) storage tanks are lighter than tanks filled with gaseous hydrogen (GH2) due to reduced tank volume needed to store liquid hydrogen versus gaseous hydrogen. Liquid hydrogen requires temperature regulation to minimize heat transfer and allow the liquid hydrogen to remain cold, thereby avoiding the vaporization of the hydrogen over time. Aircraft fuel distribution systems using cryogenic fuel tanks (e.g., fuels requiring storage at extremely low temperatures to maintain them in a liquid state) generally include a supply tank and/or trailer, a flow control valve, a volumetric flowmeter, a cryogenic valve, a flexible vacuum-jacketed flowline, and an onboard cryogenic fuel tank.

In addition to using liquid hydrogen, hydrogen-based fuel distribution systems can deliver gaseous hydrogen at required pressure(s) and/or flow rate(s) to a combustor to meet the transient performance requirements needed to assure that the engine meets both transient and cruise condition requirements. However, the fuel flow rate for an aircraft varies significantly during the flight mission. For example, a maximum fuel flow rate is used during takeoff, which is approximately four times the fuel flow rate at cruise altitude. Improved fuel distribution incorporating multiple fuel distribution systems to power an aircraft and/or turbine engine would permit increased engine efficiency.

Methods and apparatus disclosed herein incorporate compressed natural gas (CNG), liquid hydrogen (LH2) and/or gaseous hydrogen (GH2) storage. In some examples, a CNG tank can be used to help enable startup and operation with natural gas and/or a natural gas/hydrogen blend. The fuel distribution system can include a submerged pump located in a primary LH2 tank and/or a secondary LH2 tank. In some examples, a low pressure submerged pump can be used in a main LH2 tank to provide a net positive suction head (NPSH) to a primary pump. In some examples, a high pressure submerged pump can be used in a secondary LH2 tank as the primary pump. Such a configuration can permit simpler servicing and/or replacement of the submerged pump(s) in the secondary LH2 tank without disturbing the primary LH2 tank. As such, a fuel distribution system (e.g., LH2 fuel distribution system, GH2 fuel distribution system, CNG fuel distribution system) can be initiated based on take-off and/or cruise altitude fuel mass flow rate requirements.

For the figures disclosed herein, identical numerals indicate the same elements throughout the figures. The example illustration of FIG. TA is a diagram 100 representing positioning of a hydrogen-based fuel distribution system 102 on an aircraft 103. For example, the hydrogen-based fuel distribution system 102 can include a tank supplying liquid hydrogen and/or a tank bank supplying gaseous hydrogen to the hydrogen-based fuel distribution system 102, as described in connection with FIGS. 1B and/or 1C. Although the aircraft 103 shown in FIG. TA is an airplane, the examples described herein may also be applicable to other fixed-wing aircraft, including unmanned aerial vehicles (UAV), and/or any type of non-aircraft-based application (e.g., watercraft, etc.). The hydrogen-based fuel distribution system 102 can be used to provide hydrogen fuel that will be combusted in a gas turbine engine of the aircraft 103. However, the example implementations of the fuel tank(s) described herein may also be applicable to other applications where hydrogen is used as a fuel in the aircraft 103. The examples described herein also may be applicable to engine(s) other than gas turbine engines. While the gas turbine engine is an example of a power generator for powering the aircraft 103 using hydrogen as a fuel, hydrogen may also be used as a fuel for other power generators. For example, a power generator may be a fuel cell (hydrogen fuel cell) where the hydrogen is provided to the fuel cell to generate electricity by reacting with air.

Figure 1B:
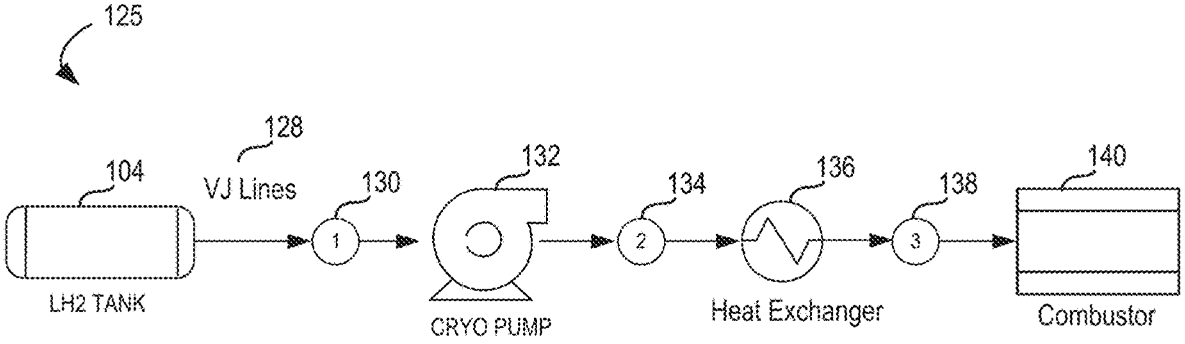

FIG. 1B illustrates an example first known system 125 for combustor start-up using an example liquid hydrogen (LH2) tank 104 supplying liquid hydrogen to a hydrogen-based fuel distribution system (e.g., hydrogen-based fuel distribution system 102 of FIG. TA). The first known system 125 for combustor start-up includes the LH2 fuel tank 104 for maintaining the hydrogen fuel in a liquid phase. For example, the LH2 fuel tank 104 may be configured to store the hydrogen fuel at a temperature of about −253° C. or less, and at a pressure greater than about one bar and less than about 10 bar, such as between about three bar and about five bar, or at other temperatures and pressures to maintain the hydrogen fuel substantially in the liquid phase. In the example of FIG. 1B, the combustor start-up components are connected in series by coupled vacuum-jacketed (VJ) flowlines (e.g., VJ flowline(s) 128). In the example of FIG. 1B, flow control valve(s) 130, 134, 138 can be used to regulate the flow of LH2 from the LH2 tank 104. The flow control valve(s) 130, 134, 138 can be constructed to thermally insulate the cryogenic fuel during transmission so that the fluid does not heat up, vaporize, and/or leak out as a gas. In the example of FIG. 1B, the flow control valve 130 is connected to the LH2 fuel tank 104 by the VJ flowline(s) 128. In some examples, the flow control valve(s) 130, 134, 138 operate at working temperatures lower than 233 K and may be used for transmitting low temperature cryogenic fluid (e.g., liquefied natural gas, liquid oxygen, liquid hydrogen, etc.).

The combustor start-up components also include a cryogenic pump 132 and a heat exchanger 136 located downstream of the pump 132. The pump 132 can be configured to provide a flow of the hydrogen fuel in the liquid phase from the LH2 fuel tank 104 through the first known system 125 for combustor start-up. Operation of the pump 132 can be increased or decreased to effectuate a change in a volume of the hydrogen fuel through the first known system 125 for combustor start-up. The pump 132 may be any suitable pump configured to provide a flow of liquid hydrogen fuel. The heat exchanger 136 is located downstream of the pump 132 and is configured to convert the hydrogen fuel from the liquid phase to a gaseous phase. For example, the heat exchanger 136 may be in thermal communication with the engine and/or an accessory system of the engine to provide the heat necessary to increase a temperature of the hydrogen fuel to change the hydrogen fuel from the liquid phase to the gaseous phase. The converted hydrogen fuel is then routed to an example engine combustor 140. A desired amount of fuel is provided to the combustor 140 using the flow control valve 138.

Figure 1C:
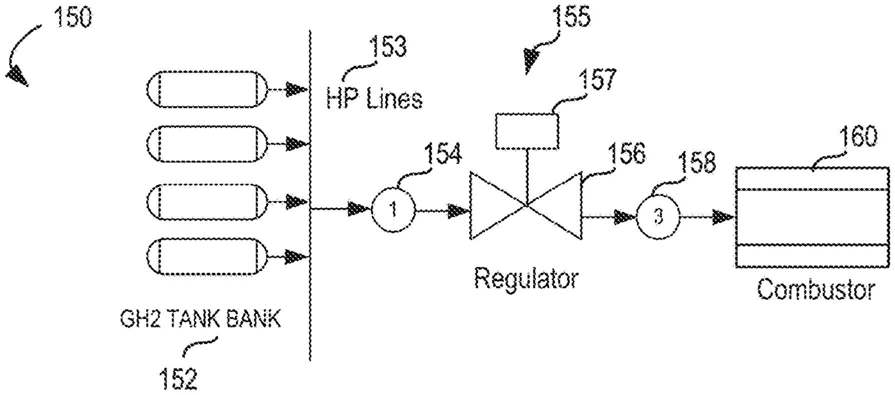

FIG. 1C illustrates an example second known system 150 for combustor start-up using an example gaseous hydrogen (GH2) tank bank 152 supplying gaseous hydrogen to a hydrogen-based fuel distribution system. In the example of FIG. 1C, the GH2 tank bank 152 can be configured to store hydrogen fuel in a gaseous phase. For example, the GH2 tank bank 152 may be configured to store the second portion of the hydrogen fuel at a temperature within about 50° C. of an ambient temperature, or between about −50° C. and about 100° C. In some examples, the GH2 tank bank 152 may be configured as a plurality of gaseous hydrogen fuel tanks to reduce an overall size and/or weight that would otherwise be needed to contain the desired volume of the hydrogen fuel in the gaseous phase at the desired pressures. In the example of FIG. 1C, the GH2 tank bank 152 is connected in series with a regulator 155 and a combustor 160. In the example of FIG. 1C, flow control valve(s) 154, 158 can be used to regulate the flow of GH2 from the GH2 tank bank 152. In the example of FIG. 1C, the flow control valve 154 is connected to the GH2 tank bank 152 by the HP flowline(s) 153 en route to the regulator 155. The regulator 155 can be a gaseous hydrogen delivery assembly flow regulator (GHDA flow regulator). The regulator 155 can be configured as an actively controlled variable throughput valve configured to provide a variable throughput ranging from 0% (e.g., a completely closed off position) to 100% (e.g., a completely open position), as well as a number of intermediate throughput values therebetween. In the example of FIG. 1C, the regulator 155 includes a valve portion 156 and an actuator 157. The actuator 157 is mechanically coupled to the valve portion 156 to provide the variable throughput therethrough. In the example of FIG. 1C, the hydrogen fuel in a gaseous phase is transferred to the combustor 160 via the flow control valve 158.

While in the examples of FIGS. 1B and 1C engine startup can be enabled using liquid hydrogen from the liquid hydrogen (LH2) tank 104 based on the first known system 125 for combustor start-up or gaseous hydrogen from the GH2 tank bank 152 based on the second known system 150 for combustor start-up, the fuel distribution system in these examples does not account for take-off and/or cruise altitude fuel mass flow rate requirement variations that can be efficiently achieved using a combination of a LH2 fuel distribution system, a GH2 fuel distribution system, and/or a compressed natural gas (CNG) fuel distribution system), as described in connection with FIGS. 1-8. For example, inclusion of a gaseous hydrogen fuel tank in addition to a liquid hydrogen fuel tank can facilitate starting the engine utilizing a flow of gaseous hydrogen fuel from the gaseous hydrogen fuel tank, prior to the engine generating a sufficient amount of heat to change the phase of liquid hydrogen fuel from the liquid hydrogen fuel tank to gaseous hydrogen fuel, thereby allowing for the use of an engine heat exchanger with the liquid hydrogen delivery assembly during the remaining operations of the engine, as described in connection with FIG. 7.

Figure 2:
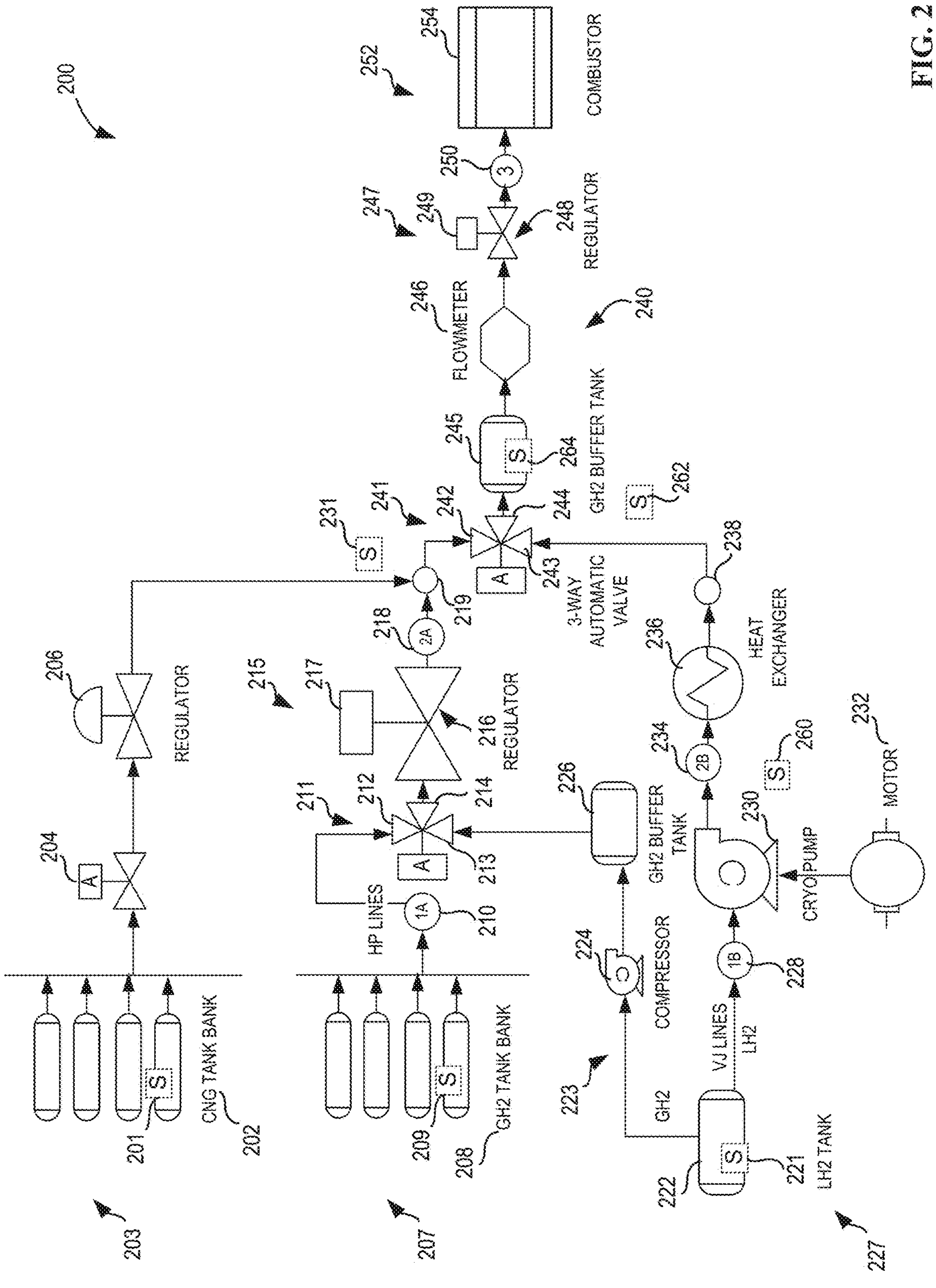
FIG. 2 schematically illustrates a first example fuel distribution arrangement using a compressed natural gas (CNG) tank bank, a gaseous hydrogen (GH2) tank bank, and/or a liquid hydrogen (LH2) tank.

FIG. 2 illustrates a first example fuel distribution arrangement 200 using a compressed natural gas (CNG) tank bank 202, a gaseous hydrogen (GH2) tank bank 208, and/or a liquid hydrogen (LH2) tank 222 as part of a compressed natural gas delivery assembly 203, a gaseous hydrogen delivery assembly 207, and/or a liquid hydrogen delivery assembly 227. In the example of FIG. 2, the CNG tank bank 202, the GH2 tank bank 208, and/or the LH2 tank 222 arrangement can be used for facilitating starting the engine of a vehicle, where the engine can include an aeronautical gas turbine engine and/or a turbofan engine, for example. In some examples, the CNG tank bank 202, the GH2 tank bank 208, and/or the LH2 tank 222 arrangement can be used as a power supply and/or generator. Such an engine generally includes a combustion section having a combustor (e.g., combustor 254 of engine 252) with one or more fuel nozzles. However, the vehicle may be any other suitable land or aeronautical vehicle, and the engine may be any other suitable engine mounted to or within the vehicle in any suitable manner.

The example fuel distribution arrangement 200 of FIG. 2 includes the CNG tank bank 202 to hold natural gas, the GH2 tank bank 208 to hold a first portion of hydrogen fuel in a gaseous phase, and/or the LH2 tank 222 to hold a second portion of hydrogen fuel in a liquid phase. For example, the CNG tank bank 202 can be used to introduce natural gas during engine startup without reliance on only liquid or gaseous hydrogen-based fuel. In some examples, the GH2 tank bank 208 can be used to provide gaseous hydrogen during takeoff and climbing, while the LH2 tank 222 can be switched to during a cruising phase of flight. For example, fuel consumption needs can vary based on a particular phase of the flight (e.g., taxing, takeoff, cruising, etc.). A relatively low hydrogen fuel flow rate is employed during the taxi operation, while the takeoff phase requires a relatively high hydrogen fuel flow rate (e.g., about 100% of a maximum hydrogen fuel flow rate for a given flight path). Meanwhile, the climb phase also requires a relatively high hydrogen fuel flow rate (e.g., between about 50% and 90% of the maximum hydrogen fuel flow rate). Cruising is the longest operation during the flight, with relatively low commanded hydrogen fuel flow (e.g., between about 25% and about 40% of the maximum hydrogen fuel flow rate). The highest fuel consumption occurs during cruise due to the duration of the cruise phase being the longest of the entire flight. During approach and landing operations, fuel flow rate is the lowest of the flight (e.g., less than about 20%, such as less than about 15% of the maximum hydrogen fuel flow rate). As such, using the CNG tank bank 202, the GH2 tank bank 208, and/or the LH2 tank 222 arrangements shown in FIGS. 2-7 permits varying arrangement(s) of fuel distribution based on a given operation being performed by the aircraft (e.g., taxing, takeoff, cruising, etc.) to match the necessary fuel flow rates.

In the example of FIG. 2, compressed natural gas flows from the CNG tank bank 202 to an automatic control valve 204, which includes an actuator and a valve portion. The actuator of the automatic control valve 204 is mechanically coupled to the valve portion of the automatic control valve 204 to provide the variable throughput therethrough. In some examples, the natural gas flows through a dynamically adjusted regulator 206. In the example of FIG. 2, the dynamically adjusted regulator 206 is a pneumatic valve. The flow from the CNG tank bank 202 can be tracked by one or more sensor(s) for sensing various operability parameters of the fuel distribution arrangement 200 of FIG. 2. For example, the fuel distribution arrangement 200 includes a first sensor 201 configured to sense data indicative of the CNG tank bank 202, a second sensor 209 configured to sense data indicative of the GH2 tank bank 208, and a third sensor 221 configured to sense data indicative of the LH2 tank 222 (e.g., an internal temperature, an internal pressure, a temperature and/or pressure of gaseous and/or liquid fuel flowing from the fuel tank(s) 202, 208, 222, etc.). The fuel distribution arrangement 200 of FIG. 2 also includes a fourth sensor 231 configured to sense data indicative of a flow of gaseous hydrogen fuel from the GH2 tank bank 208 and/or a flow of compressed natural gas from the CNG tank bank 202 (e.g., a temperature, a pressure, and/or a flow rate of gaseous hydrogen fuel at a location upstream of the RA flow regulator 247, at a location downstream of the RA flow regulator 247, or both), a fifth sensor 260 configured to sense data indicative of a flow of liquid hydrogen fuel through the pump 230 (e.g., a temperature, a pressure, and/or a flow rate of liquid hydrogen fuel at a location upstream of the pump 230, at a location downstream of the pump 230, or both), a sixth sensor 262 configured to sense data indicative of a flow rate and/or phase of the hydrogen fuel downstream of the heat exchanger 236 (e.g., a temperature, a pressure, and/or a flow rate), and a seventh sensor 264 configured sense data indicative of a hydrogen fuel within the buffer tank 245 (e.g., a pressure, a temperature, and/or a mass of hydrogen fuel within an internal cavity of the buffer tank 245).

While the CNG tank bank 202 stores compressed natural gas, the GH2 tank bank 208 is configured to store a first portion of hydrogen fuel in a gaseous phase, and the LH2 tank 222 is configured to store the second portion of hydrogen fuel in a liquid phase. For example, hydrogen in liquid form can be stored in larger quantities than hydrogen in gaseous form, allowing the LH2 tank 222 to be a larger tank than the individual tanks found in the GH2 tank bank 208. For example, in the GH2 tank bank 208, the hydrogen is stored under pressure, whereas in the LH2 tank 222 the hydrogen is cooled to a liquification temperature (e.g., resulting in a lowered pressure within the tank). The density of liquid hydrogen is higher than hydrogen gas, making it possible to store the same quantity of hydrogen in a reduced volume. The GH2 tank bank 208 can be configured to store the first portion of hydrogen fuel at an increased pressure to reduce a necessary size of the GH2 tank bank 208 within an aircraft. For example, the GH2 tank bank 208 can be configured to store the first portion of hydrogen fuel at a pressure from about 100 bar up to about 1,000 bar. The GH2 tank bank 208 can be configured to store the first portion of the hydrogen fuel at a temperature within about 50° C. of an ambient temperature, or between about −50° C. and about 100° C. In some examples, the GH2 tank bank 208 can be configured as a plurality of GH2 tank bank(s) 208 to reduce an overall size and weight that would otherwise be needed to contain the desired volume of the first portion of hydrogen fuel in the gaseous phase at the desired pressures. As described in connection with FIG. 1C, gaseous hydrogen delivery can include the use of flow control valve(s) (e.g., example flow control valve 210 of FIG. 2). Gaseous hydrogel delivery can also include a three-way boil-off valve 211 defining a first input 212, a second input 213, and an output 214. In the example of FIG. 2, the first input 212 is in fluid communication with the GH2 tank bank 208 for receiving a flow of the first portion of hydrogen fuel in the gaseous phase from the GH2 tank bank 208. The second input 213 is in fluid communication with a boil-off fuel assembly 223 for receiving a flow of gaseous hydrogen fuel from the boil-off tank 226 of the boil-off fuel assembly 223. The three-way boil-off valve 211 can be configured to combine and/or alternate the flows from the first input 212 and the second input 213 to a single flow of gaseous hydrogen through the output 214. For example, the three-way boil-off valve 211 can be an active valve, such that an amount of gaseous hydrogen fuel provided from the first input 212, as compared to the amount of gaseous hydrogen fuel provided from the second input 213, to the output 214 can be actively controlled. In some examples, the three-way boil-off valve 211 can be a passive valve.

The first example fuel distribution arrangement 200 includes a gaseous hydrogen delivery assembly (GHDA) flow regulator 215. As described in connection with FIG. 1C, the GHDA flow regulator 215 can be configured as an actively controlled variable throughput valve configured to provide a variable throughput ranging from 0% (e.g., a completely closed off position) to 100% (e.g., a completely open position), as well as a number of intermediate throughput values therebetween. In FIG. 2, the GHDA flow regulator 215 includes a valve portion 216 and an actuator 217. The actuator 217 is mechanically coupled to the valve portion 216 to provide the variable throughput therethrough. Flow control valve 218 regulates gaseous hydrogen flow from the GH2 tank bank 208, while flow control valve 219 regulates gaseous hydrogen flow (e.g., originating from the GH2 tank bank 208) and compressed natural gas flow (e.g., originating from the CNG tank bank 202).

An example regulator assembly 240 is in fluid communication with the compressed natural gas delivery assembly 203, the gaseous hydrogen delivery assembly 207, and/or the liquid hydrogen delivery assembly 227 for providing hydrogen fuel to the engine 252, and, more specifically, to the combustor 254 of the engine 252. In the example of FIG. 2, the regulator assembly 240 includes a three-way regulator valve 241. The three-way regulator valve 241 defines a first input 242, a second input 243, and an output 244. The first input 242 may be in fluid communication with the gaseous hydrogen delivery assembly 207 and/or the compressed natural gas delivery assembly 203 to receive a flow of the compressed natural gas and/or the first portion of hydrogen fuel in the gaseous phase from the GH2 tank bank 208. The second input 243 is in fluid communication with the liquid hydrogen delivery assembly 227 to receive a flow of the second portion of the hydrogen fuel in the gaseous phase from the liquid hydrogen fuel tank 222 (vaporized using, e.g., the heat exchanger 236). The three-way regulator valve 241 may be configured to combine and/or alternate the flows from the first input 242 and the second input 243 to a single flow of gaseous hydrogen through the output 244. For the example shown in FIG. 2, the three-way regulator valve 241 is an active three-way regulator valve, including an actuator, such that an amount of hydrogen fuel provided from the first input 242, as compared to the amount of hydrogen fuel provided from the second input 243, to the output 244 may be actively controlled.

In the example of FIG. 2, the second input 243 of the three-way regulator valve 241 receives hydrogen fuel originating from a liquid hydrogen delivery assembly 227 which includes the LH2 tank 222, a pump 230, and a heat exchanger 236 located downstream of the pump 230. In some examples, the LH2 tank 222 can define a fixed volume, such that as the LH2 tank 222 provides hydrogen fuel that is substantially completely in the liquid phase to the fuel distribution arrangement 200, a volume of the liquid hydrogen fuel in the LH2 tank 222 decreases, and the volume is made up by, for example, gaseous hydrogen fuel.

Further, during the normal course of storing a portion of hydrogen fuel in the liquid phase, an amount of the hydrogen fuel can vaporize. To prevent an internal pressure within the LH2 tank 222 from exceeding a desired pressure threshold, the fuel distribution arrangement 200 of FIG. 2 allows for a purging of gaseous hydrogen fuel from the LH2 tank 222. For example, the fuel distribution arrangement 200 includes a boil-off fuel assembly 223 configured to receive gaseous hydrogen fuel from the LH2 tank 222. The boil-off fuel assembly 223 generally includes a boil-off compressor 224 and a boil-off tank 226. The boil-off tank 226 is in fluid communication with the LH2 tank 222 and is further in fluid communication with the gaseous hydrogen delivery assembly 207.

During operation, gaseous fuel from the LH2 tank 222 can be received in the boil-off fuel assembly 223, compressed by the boil-off compressor 224 and provided to the boil-off tank 226. The boil-off tank 226 may be configured to store the gaseous hydrogen fuel at a lower pressure than the pressure of the hydrogen fuel within the GH2 tank bank 208. For example, the boil-off tank 226 can be configured to maintain gaseous hydrogen fuel therein at a pressure of between about 100 bar and about 400 bar. The pressurization of the gaseous hydrogen fuel in the boil-off tank 226 can be provided substantially completely by the boil-off compressor 224. Maintaining the gaseous hydrogen fuel in the boil-off tank 226 at the lower pressure can allow for the boil-off compressor 224 to be relatively small.

The LH2 tank 222 can be connected to an example flow control valve 228 (e.g., via VJ flowline(s)), which is in connection with the pump 230. The pump 230 is configured to provide a flow of hydrogen fuel in the liquid phase from the LH2 tank 222 through the liquid hydrogen delivery assembly 227. Operation of the pump 230 can be increased or decreased to effectuate a change in a volume of the hydrogen fuel through the liquid hydrogen delivery assembly 227 and to the regulator assembly 240 and engine 252. The pump 230 can be any suitable pump configured to provide a flow of liquid hydrogen fuel. For example, the pump 230 can be configured as a cryogenic pump. In some examples, the pump 230 is the primary pump for the liquid hydrogen delivery assembly 227, such that substantially all of a motive force available for providing a flow of liquid hydrogen through the liquid hydrogen delivery assembly 227 (excluding an internal pressurization of the liquid hydrogen fuel tank 222) is provided by the pump 230. In some examples, at least about 75% of the motive force available for providing a flow of liquid hydrogen through the liquid hydrogen delivery assembly 227 can be provided by the pump 230. The pump 230 can generally define a maximum pump capacity and a minimum pump capacity (each in kilograms per second). A ratio of the maximum pump capacity to the minimum pump capacity may be referred to as a turndown ratio of the pump. In some examples, the pump 230 can define a turndown ratio of at least 1:1 and up to about 6:1. In the example of FIG. 2, a motor 232 can be used to power the pump 230.

The heat exchanger 236 is located downstream of the pump 230 and an example flow control valve 234 and is configured to convert a portion of the hydrogen fuel through the liquid hydrogen delivery assembly 227 from the liquid phase to a gaseous phase. In some examples, the heat exchanger 236 can be in thermal communication with the engine 252, and, more specifically, with an accessory system of the engine 252 to provide the heat necessary to increase a temperature of the hydrogen fuel through the liquid hydrogen delivery assembly 227 to change a portion of the hydrogen fuel from the liquid phase to the gaseous phase. In the example of FIG. 2, flow from the heat exchanger 236 is regulated using an example flow control valve 238 en route to the second input 243 of the three-way regulator valve 241 as part of the regulator assembly 240.

In the example of FIG. 2, the regulator assembly 240 further includes a buffer tank 245, a flowmeter 246, and a regulator assembly flow regulator 247 ("RA flow regulator 247"). The buffer tank 245 is configured to vary a mass flow rate of the hydrogen fuel from a fluid inlet to a fluid outlet during at least certain operations. In some examples, the buffer tank 245 can be configured to purge gaseous hydrogen fuel from within the buffer tank 245 through an exhaust valve when an internal pressure of the buffer tank 245 (e.g., a pressure within an internal cavity) exceeds an upper threshold. For example, the buffer tank 245 can accept hydrogen fuel (e.g., at a fluid inlet) at a greater flow rate than provided by the buffer tank 245 (e.g., at a fluid outlet) even when an internal pressure of the buffer tank 245 is at or exceeds an upper bound or upper threshold for the buffer tank 245 (e.g., more rapidly reduce a mass flowrate of hydrogen fuel to the combustor 254 of the engine 252). By virtue of its position within the regulator assembly 240, the buffer tank 245 is in fluid communication with the compressed natural gas delivery assembly 203, the gaseous hydrogen delivery assembly 207, and/or the liquid hydrogen delivery assembly 227. As such, the buffer tank 245 can be configured to receive hydrogen fuel from the compressed natural gas delivery assembly 203, the gaseous hydrogen delivery assembly 207, and/or the liquid hydrogen delivery assembly 227.

The flowmeter 246 of the regulator assembly 240 can sense data indicative of a mass flow rate of hydrogen fuel through the regulator assembly 240. For example, the flowmeter 246 can sense data indicative of one or more of a temperature of the gaseous hydrogen fuel flowing therethrough and a pressure of the gaseous hydrogen fuel flowing therethrough. In some examples, data from the flowmeter 246 can be utilized to control regulator assembly (RA) flow regulator 247 to ensure a desired amount of fuel is provided to the combustor 254 of the engine 252. The RA flow regulator 247 can be configured as an actively controlled variable throughput valve configured to provide a variable throughput ranging from 0% (e.g., a completely closed off position) to 100% (e.g., a completely open position), as well as a number of intermediate throughput values therebetween. For example, the RA flow regulator 247 includes a valve portion 248 and an actuator 249. The actuator 249 is mechanically coupled to the valve portion 248 to provide the variable throughput therethrough. In the example of FIG. 2, the RA flow regulator 247 is in connection with the combustor 254 of the engine 252 via a flow control valve 250.

Figure 3:
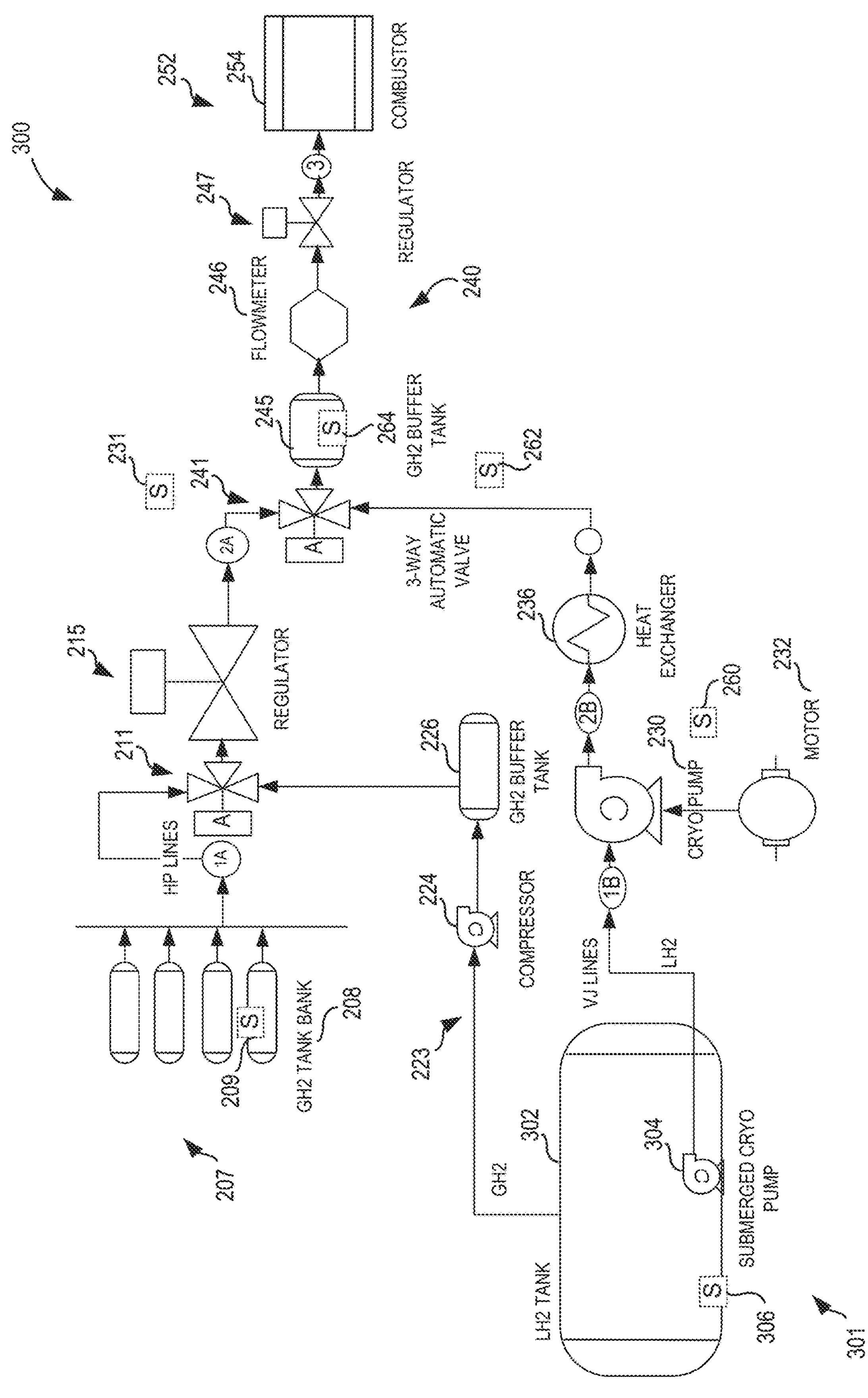
FIG. 3 schematically illustrates a second example fuel distribution arrangement using a gaseous hydrogen (GH2) tank bank and/or a primary liquid hydrogen (LH2) tank with a submerged cryogenic pump.

FIG. 3 illustrates a second example fuel distribution arrangement 300 using the gaseous hydrogen (GH2) tank bank 208 and/or a primary liquid hydrogen (LH2) tank 302 with a submerged cryogenic pump 304. The second example fuel distribution arrangement 300 includes the gaseous hydrogen delivery assembly 207 of FIG. 2, an example liquid hydrogen delivery assembly 301, and the regulator assembly 240 of FIG. 2. In the example of FIG. 3, the submerged cryogenic pump 304 can be a low pressure pump used for achieving a net positive suction head (NPSH), which represents the pressure or energy for the liquid in a pump to overcome the friction losses from the suction nozzle to the eye of the impeller without causing vaporization. In some examples, the submerged cryogenic pump 304 can be used to pump the primary liquid hydrogen (LH2) tank 302 empty. In some examples, without the use of the submerged cryogenic pump 304, only approximately 60% of the primary liquid hydrogen (LH2) tank 302 can be used, as in the example of FIG. 2 (e.g., using the external cryopump 230 to pump liquid hydrogen from the LH2 tank 222). As such, when the liquid hydrogen level drops below 40%, the use of a single pump (e.g., external cryopump 230) can create challenges getting the NPSH to pump the LH2. In the example of FIG. 3, the primary liquid hydrogen (LH2) tank 302 includes a sensor 306 configured to sense data indicative of the LH2 tank 302 and/or the submerged cryogenic pump 304 (e.g., an internal temperature, an internal pressure, a temperature and/or pressure of liquid fuel flowing from the fuel tank 302). In some examples, the submerged cryogenic pump 304 is a low pressure submerged pump, allowing the pump to last longer as opposed to the use of a high pressure submerged pump. In the example of FIG. 3, the three-way regulator valve 241 receives hydrogen fuel originating from the gaseous hydrogen (GH2) tank bank 208 via the three-way boil-off valve 211 and the gaseous hydrogen delivery assembly flow regulator 215. The three-way regulator valve 241 also receives hydrogen fuel originating from the LH2 tank 302 via the submerged cryogenic pump 304, the cryopump 230, and the heat exchanger 236. In the example of FIG. 3, output from the three-way regulator valve 241 travels to the regulator assembly 240 (e.g., which includes the buffer tank 245, the flowmeter 246, and the regulator assembly flow regulator 247) prior to reaching the combustor 254.

Figure 4:
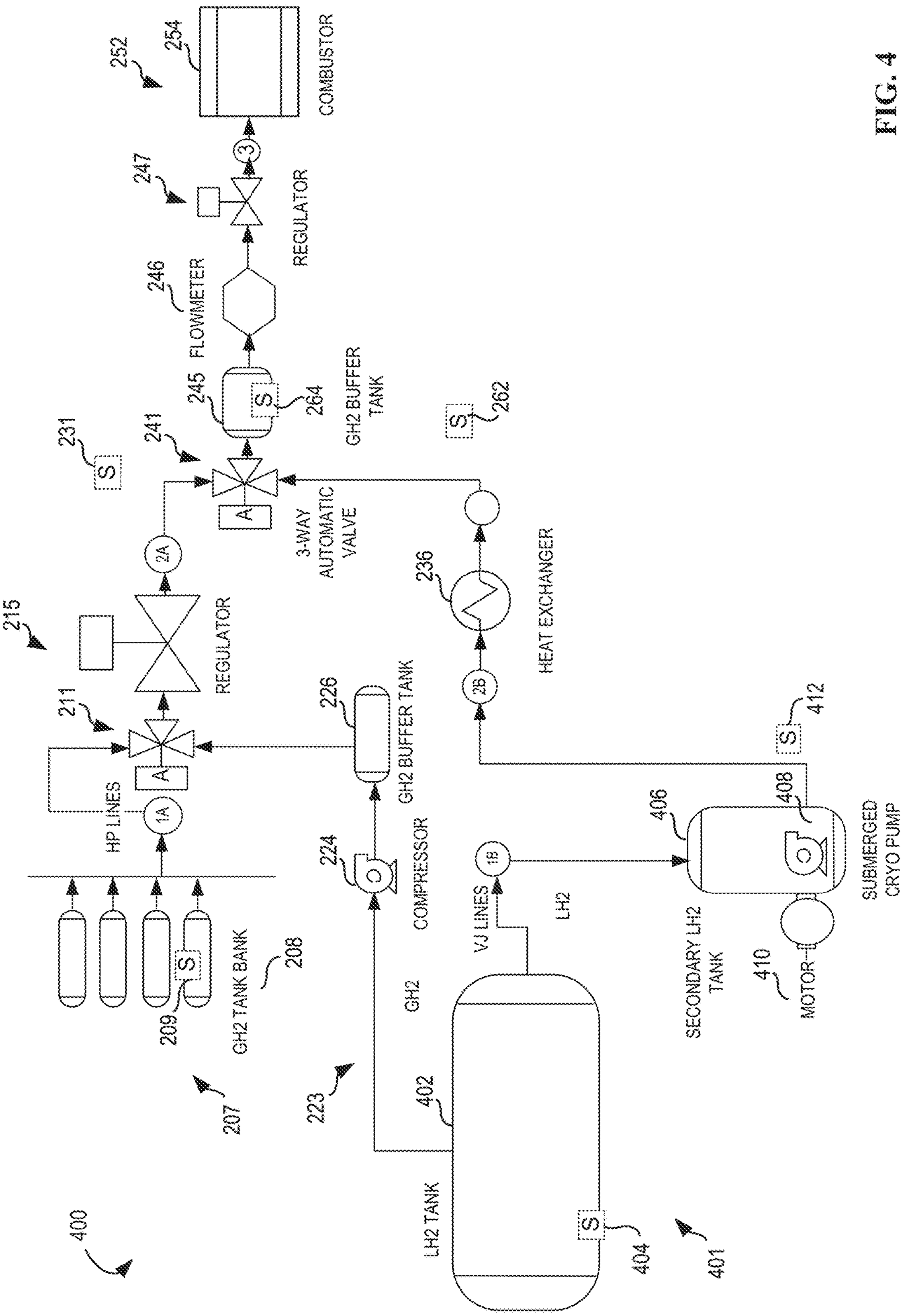
FIG. 4 schematically illustrates a third example fuel distribution arrangement using a gaseous hydrogen (GH2) tank bank, a primary liquid hydrogen (LH2) tank, and/or a secondary LH2 tank with a submerged cryogenic pump.

FIG. 4 illustrates a third example fuel distribution arrangement 400 using the gaseous hydrogen (GH2) tank bank 208, a primary liquid hydrogen (LH2) tank 402, and/or a secondary LH2 tank 406 with a submerged cryogenic pump 408. The third example fuel distribution arrangement 400 includes the gaseous hydrogen delivery assembly 207 of FIG. 2, an example liquid hydrogen delivery assembly 401, and the regulator assembly 240 of FIG. 2. In the example of FIG. 4, the primary liquid hydrogen (LH2) tank 402 can represent a main tank that stays with the aircraft for the aircraft's lifetime. In contrast, the secondary LH2 tank 406 includes the submerged cryogenic pump 408 allowing the secondary LH2 tank 406 to be removable and/or accessible. For the purposes of servicing and/or replacing the submerged cryogenic pump 408, the use of a secondary LH2 tank 406 can make the servicing of the pump easier as compared to when the pump is submerged in the LH2 tank 302 of FIG. 3. The liquid hydrogen delivery assembly 401 of FIG. 4 includes a sensor 404 configured to sense data indicative of the LH2 tank 402 and a sensor 412 configured to sense data indicative of the secondary LH2 tank 406 and/or the submerged cryogenic pump 408. In the example of FIG. 4, the secondary LH2 tank 406 includes a motor 410 used to engage the submerged cryogenic pump 408. The submerged cryogenic pump 408 can be a high pressure pump and/or a low pressure pump. In the example of FIG. 4, the three-way regulator valve 241 receives hydrogen fuel originating from the gaseous hydrogen (GH2) tank bank 208 via the three-way boil-off valve 211 and the gaseous hydrogen delivery assembly flow regulator 215. The three-way regulator valve 241 also receives hydrogen fuel originating from the primary LH2 tank 402 and/or the secondary LH2 tank 406 via the submerged cryogenic pump 408 and the heat exchanger 236. In the example of FIG. 4, output from the three-way regulator valve 241 travels to the regulator assembly 240 (e.g., which includes the buffer tank 245, the flowmeter 246, and the regulator assembly flow regulator 247) prior to reaching the combustor 254.

Figure 5:
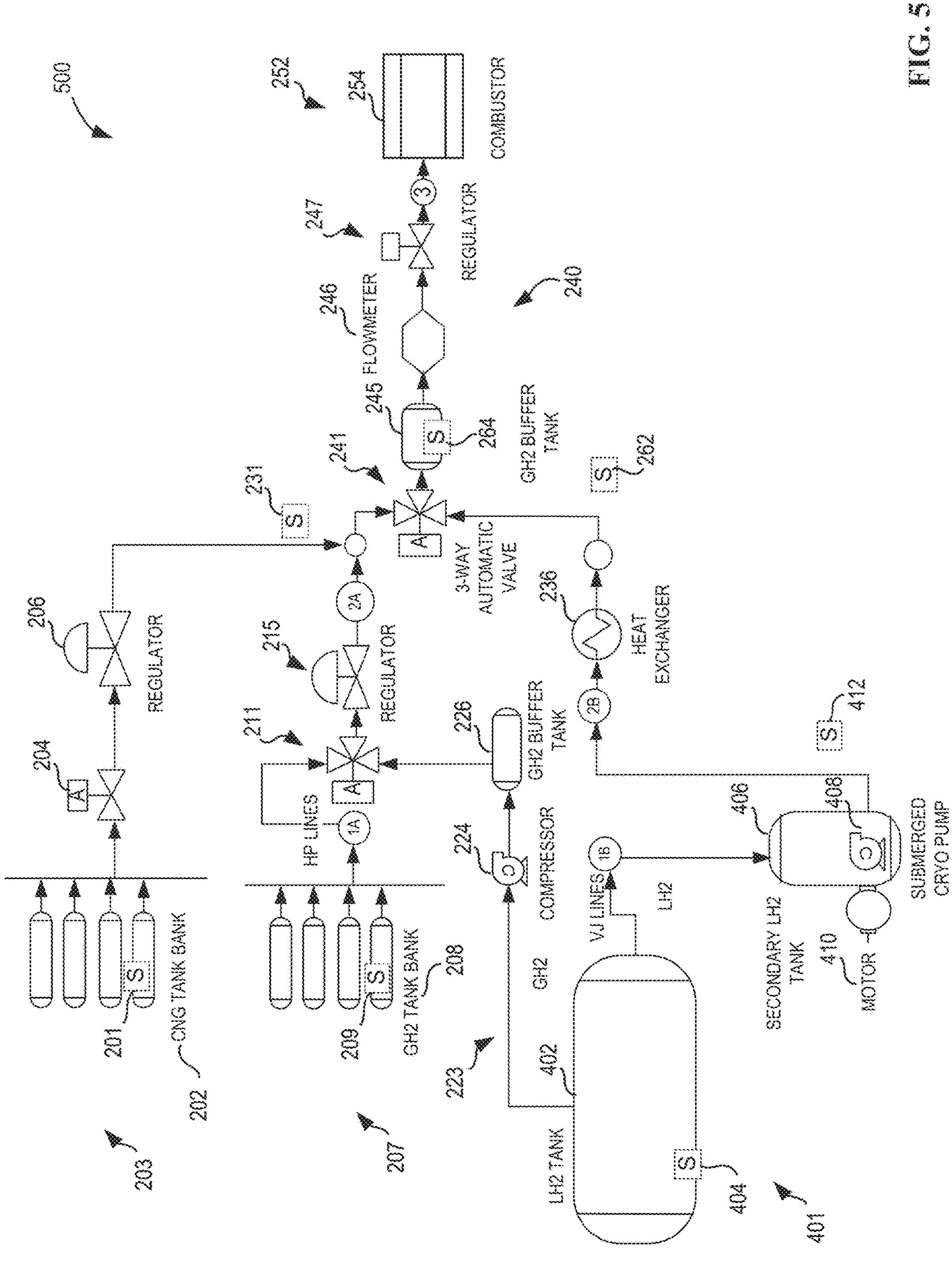
FIG. 5 schematically illustrates a fourth example fuel distribution arrangement using a compressed natural gas (CNG) tank bank, a gaseous hydrogen (GH2) tank bank, a primary liquid hydrogen (LH2) tank, and/or a secondary LH2 tank with a submerged cryogenic pump.

FIG. 5 illustrates a fourth example fuel distribution arrangement 500 using the compressed natural gas (CNG) tank bank 202, the gaseous hydrogen (GH2) tank bank 208, the primary liquid hydrogen (LH2) tank 402, and/or the secondary LH2 tank 406 with the submerged cryogenic pump 408 of FIG. 5. The fourth example fuel distribution arrangement 500 includes the compressed natural gas (CNG) delivery assembly 203 of FIG. 2, the gaseous hydrogen delivery assembly 207 of FIG. 2, the liquid hydrogen delivery assembly 401 of FIG. 4, and the regulator assembly 240 of FIG. 2. As described in connection with FIG. 4, the primary liquid hydrogen (LH2) tank 402 can represent a main tank that stays with the aircraft for the aircraft's lifetime, while the secondary LH2 tank 406 includes the submerged cryogenic pump 408 allowing the secondary LH2 tank 406 to be removable and/or accessible. In the example of FIG. 5, the three-way regulator valve 241 receives hydrogen fuel originating from the CNG tank bank 202 (e.g., via the automatic control valve 204 and the dynamically adjusted regulator 206) and the gaseous hydrogen (GH2) tank bank 208 (e.g., via the three-way boil-off valve 211 and the gaseous hydrogen delivery assembly flow regulator 215). The three-way regulator valve 241 also receives hydrogen fuel originating from the primary LH2 tank 402 and/or the secondary LH2 tank 406 via the submerged cryogenic pump 408 and the heat exchanger 236. In the example of FIG. 5, output from the three-way regulator valve 241 travels to the regulator assembly 240 (e.g., which includes the buffer tank 245, the flowmeter 246, and the regulator assembly flow regulator 247) prior to reaching the combustor 254.

Figure 6:
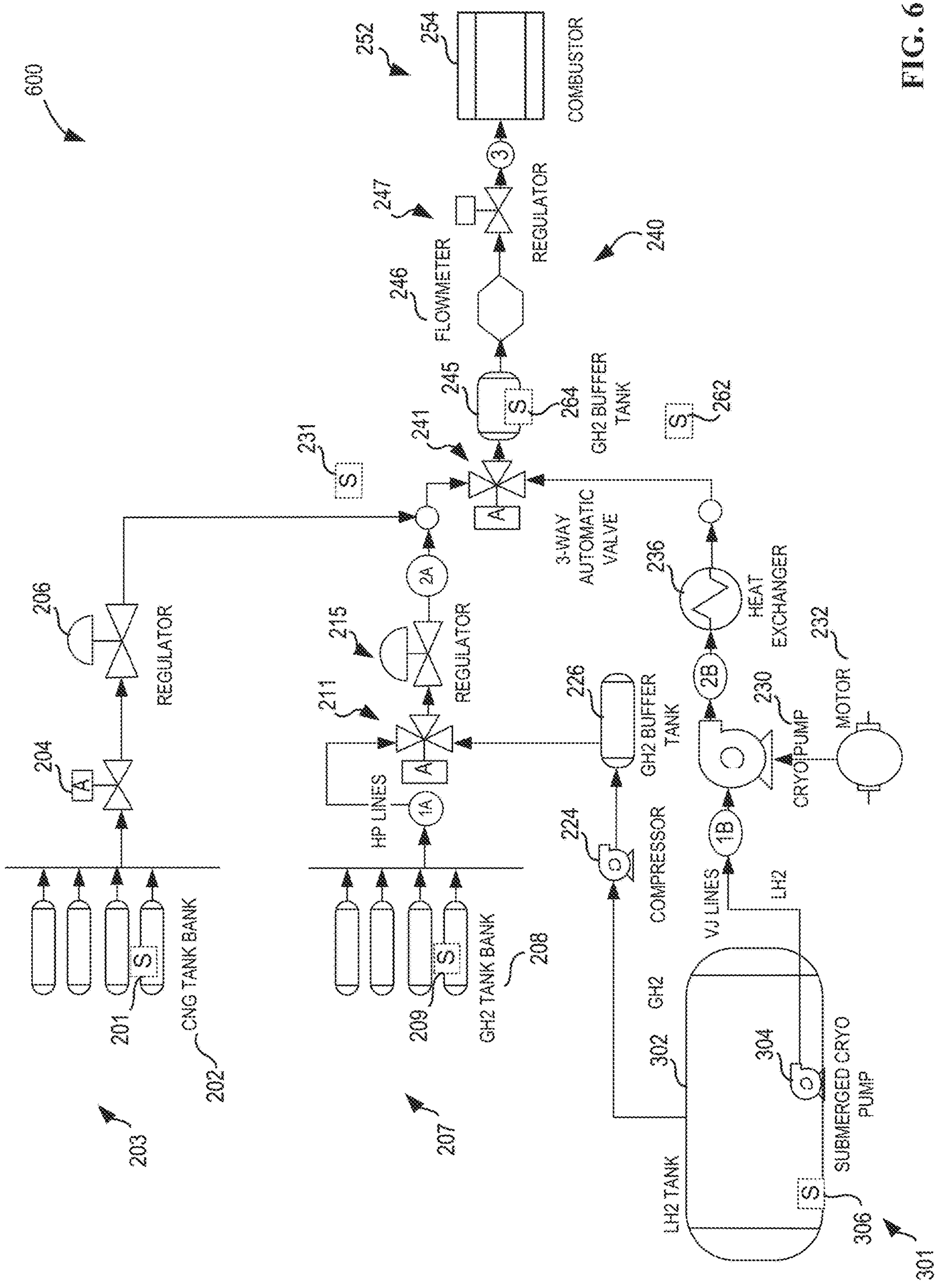
FIG. 6 schematically illustrates a fifth example fuel distribution arrangement using a compressed natural gas (CNG) tank bank, a gaseous hydrogen (GH2) tank bank, and/or a primary liquid hydrogen (LH2) tank with a submerged cryogenic pump.

FIG. 6 illustrates a fifth example fuel distribution arrangement 600 using the compressed natural gas (CNG) tank bank 202, the gaseous hydrogen (GH2) tank bank 208, and/or the liquid hydrogen (LH2) tank 302 with the submerged cryogenic pump 304 of FIG. 3. The fifth example fuel distribution arrangement 600 includes the compressed natural gas (CNG) delivery assembly 203 of FIG. 2, the gaseous hydrogen delivery assembly 207 of FIG. 2, the liquid hydrogen delivery assembly 301 of FIG. 3, and the regulator assembly 240 of FIG. 2. The liquid hydrogen (LH2) tank 302 includes the submerged cryogenic pump 304 to permit a greater amount of the liquid hydrogen from the LH2 tank 302 to be used. In the example of FIG. 6, the three-way regulator valve 241 receives hydrogen fuel originating from the CNG tank bank 202 (e.g., via the automatic control valve 204 and the dynamically adjusted regulator 206) and the gaseous hydrogen (GH2) tank bank 208 (e.g., via the three-way boil-off valve 211 and the gaseous hydrogen delivery assembly flow regulator 215). The three-way regulator valve 241 also receives hydrogen fuel originating from the liquid hydrogen (LH2) tank 302 via the submerged cryogenic pump 304, the cryopump 230, and/or the heat exchanger 236. In the example of FIG. 6, output from the three-way regulator valve 241 travels to the regulator assembly 240 (e.g., which includes the buffer tank 245, the flowmeter 246, and the regulator assembly flow regulator 247) prior to reaching the combustor 254.

Figure 7:
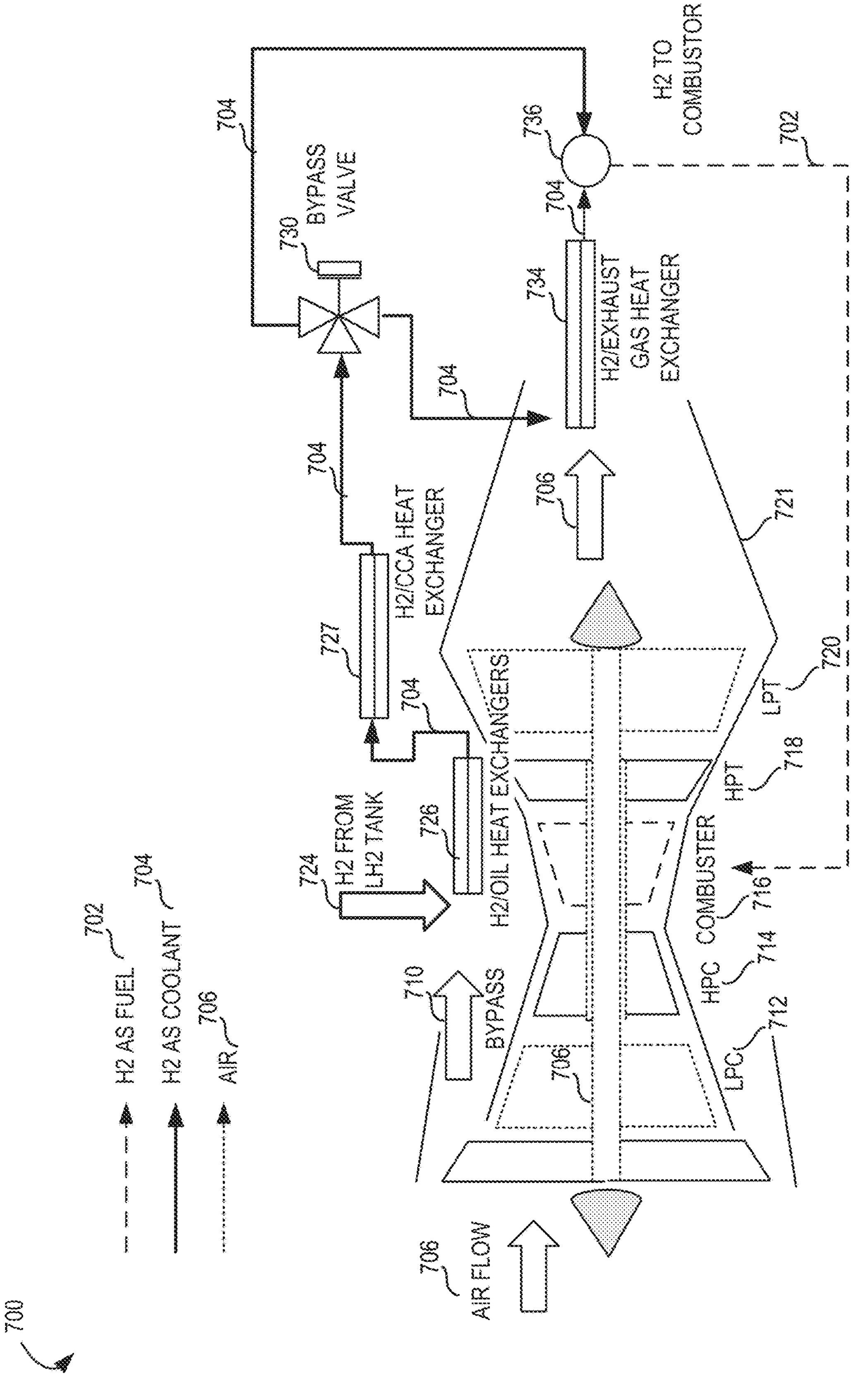
FIG. 7 schematically illustrates an example heat exchange configuration for a liquid hydrogen/oil heat exchanger, a liquid hydrogen/cooled cooling air (CCA) exchanger, and/or a liquid hydrogen/exhaust gas (EG) heat exchanger.

FIG. 7 illustrates an example heat exchange configuration 700 for a liquid hydrogen/oil heat exchanger 726, a liquid hydrogen/cooled cooling air (CCA) exchanger 727, and/or a liquid hydrogen/exhaust gas (EG) heat exchanger 734. The heat exchange configuration 700 includes an example hydrogen as fuel path 702, an example hydrogen as coolant path 704, and/or an example air path 706. The heat exchange configuration 700 represent an engine having a compressor section with an LP compressor 712 and an HP compressor 714, a combustion section including the combustor 716, a turbine section including an HP turbine 718 and an LP turbine 720, and an exhaust section 721. As described in connection with FIGS. 2-6, heat exchanger(s) (e.g., heat exchanger 236) can be in thermal communication with the engine and/or an accessory system of the engine to provide the heat necessary to increase a temperature of the hydrogen fuel to change the hydrogen fuel from the liquid phase to the gaseous phase. The converted hydrogen fuel is then routed to an example engine combustor (e.g., combustor 254). In some examples, inclusion of a gaseous hydrogen fuel tank in addition to a liquid hydrogen fuel tank can facilitate starting the engine utilizing a flow of gaseous hydrogen fuel from the gaseous hydrogen fuel tank, prior to the engine generating a sufficient amount of heat to change the phase of liquid hydrogen fuel from the liquid hydrogen fuel tank to gaseous hydrogen fuel, thereby allowing for the use of an engine heat exchanger with the liquid hydrogen delivery assembly during the remaining operations of the engine. In the example of FIG. 7, air flow 706 is confined to the low pressure compressor chamber 712 and the low pressure turbine 720. Some of the air flow bypasses the engine core (e.g., via bypass 710) but can be accelerated to provide thrust as the air is expelled rearward out of the engine. Separately, example hydrogen fuel 724 originating from the liquid hydrogen tank (e.g., LH2 tank 302, LH2 tank 402, etc.) is routed to the liquid hydrogen/oil heat exchanger 726, which results in the use of hydrogen as coolant 704 en route to the liquid hydrogen/cooled cooling air (CCA) exchanger 727. From the exchanger 727, the hydrogen as coolant 704 travels to an example bypass valve 730. The bypass valve 730 includes two outputs of hydrogen as coolant 704. The first output travels to an example flow control valve 736, which regulates flow of hydrogen to the combustor 716. The second output of the bypass valve 730 travels to the hydrogen/exhaust gas heat exchanger 734, the flow of which is further regulated by the flow control valve 736. As such, the hydrogen gas becomes a source of fuel 702 for the combustor 716 after being used as source of coolant flow 704.

Figure 8:
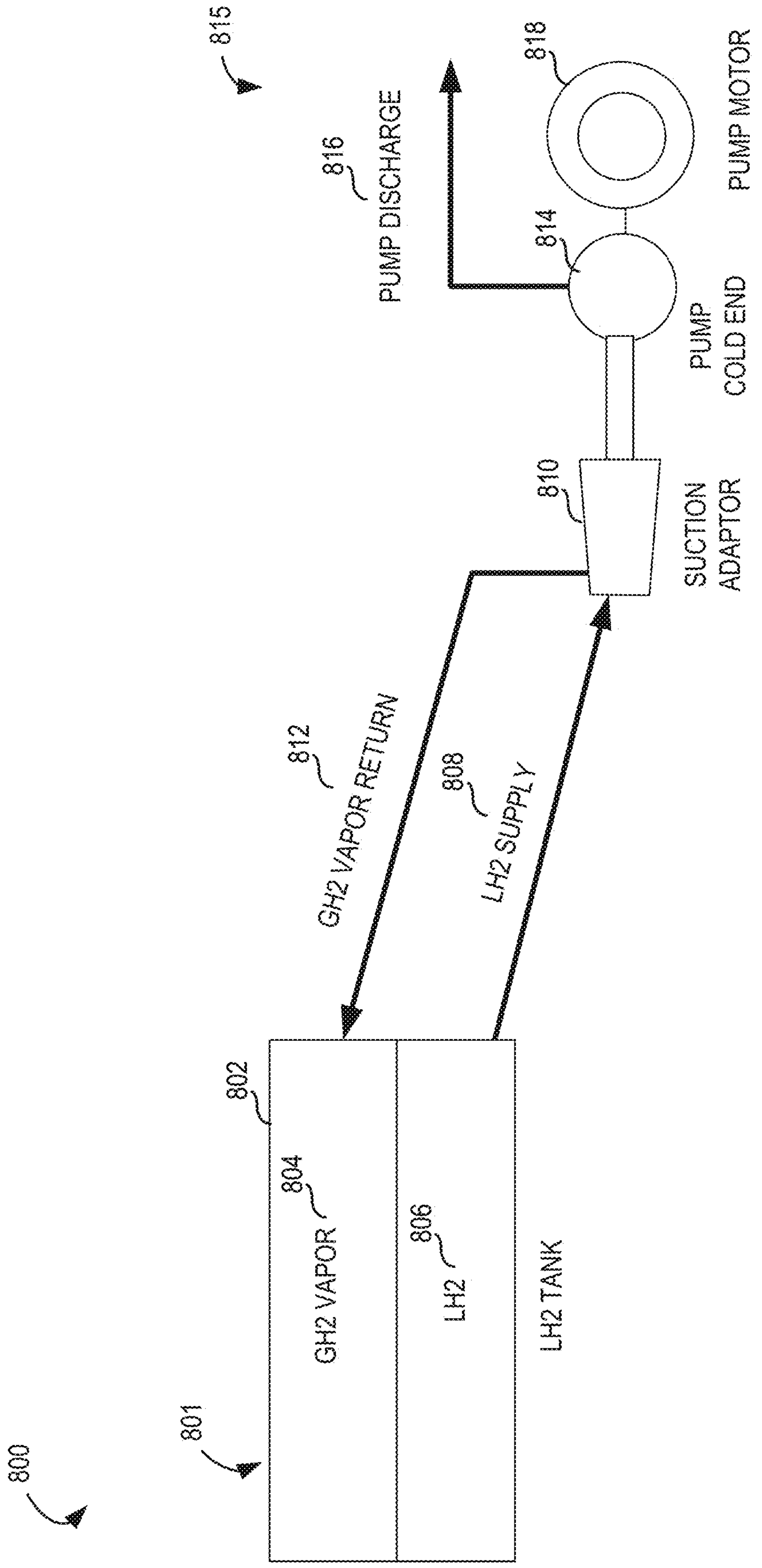
FIG. 8 schematically illustrates an example liquid hydrogen tank/liquid hydrogen pump process diagram.

FIG. 8 illustrates an example liquid hydrogen tank/liquid hydrogen pump process diagram 800. FIG. 8 includes an example fuel tank 802 connected to a fuel delivery assembly 815. The fuel delivery assembly 815 includes a liquid hydrogen pump 814, including a motor 818, to distribute the liquid hydrogen in the fuel delivery assembly 815. A discharge line 816 fluidly connects the liquid hydrogen pump 814 to the downstream components of the fuel delivery assembly 815. A suction adaptor 810 is located upstream of the liquid hydrogen pump 814 and fluidly connects the fuel extraction line 808 to the liquid hydrogen pump 814. To the extent that any gaseous hydrogen is entrained in the liquid hydrogen flowing through the fuel extraction line 808 to the liquid hydrogen pump 814, the suction adaptor 810 is configured to separate the gaseous hydrogen from the liquid hydrogen, and the gaseous hydrogen is recirculated back to the fuel tank 802, and, more specifically, to the chamber 801, by a hydrogen vapor return line 812. In the example of FIG. 8, the hydrogen vapor return line 812 is fluidly connected to the chamber 801 at the upper portion 804 of the chamber 801 to return the gaseous hydrogen to the vapor space within the chamber 801. In the example of FIG. 8, the upper portion 804 of the chamber 801 can be used to store gaseous hydrogen (e.g., GH2 vapor), while the lower portion 806 of the chamber 801 can be used to store liquid hydrogen (LH2). For example, as the fuel tank 802 provides hydrogen fuel, the volume of the liquid hydrogen fuel (LH2) in the fuel tank 802 decreases, with the remaining volume in the fuel tank is made up of gaseous hydrogen. In some examples, an upper liquid hydrogen fill line of a tank (not shown) is fluidly connected to the chamber 801 at the upper portion 804 and can be used to fill the fuel tank 802 from the top (top fill). In some examples, a lower liquid hydrogen fill line and the upper liquid hydrogen fill line of a tank (not shown) can be used to fill the fuel tank 802. In some examples, both the lower liquid hydrogen fill line and the upper liquid hydrogen fill line (not shown) can be used simultaneously to fill the fuel tank 802 with a favorable hydrogen quantity, based on desired temperature(s), pressure(s) and/or degree(s) of saturation for the hydrogen in the fuel tank 802. In the example of FIG. 8, the hydrogen vapor return line 812 fluidly connects the liquid hydrogen pump 814 and, more specifically, the suction adaptor 810, to the fuel tank 802.

In the example of FIG. 8, the hydrogen vapor return line 812 maintains a positive slope from the liquid hydrogen pump 814, and, more specifically, from the suction adaptor 810, to the fuel tank 802 to enable the vapor return by buoyancy driven flow. In some examples, the hydrogen vapor return line 812 extends in the forward direction of an aircraft and has a downward angle relative to a longitudinal axis of the fuel tank 802 to maintain the positive slope from the liquid hydrogen pump 814 during all normal operating conditions of the aircraft. In some examples, the fluid lines (e.g., fluid lines conveying liquid hydrogen, such as the fuel extraction line 808) can be vacuum jacketed pipes. The fluid lines discussed herein can be made of any suitable material, including metal, and/or have metallic portions. As can be seen in the example of FIG. 8, the liquid hydrogen pump 814 and the suction adaptor 810 are located at an elevation in the aircraft that is lower than the fuel tank 802, and, more specifically, lower than the bottom of the chamber 801. By such a position, the liquid hydrogen in the fuel tank 802 provides a net positive pressure (head) to the liquid hydrogen pump 814 and the suction adaptor 810. In this example, the net positive pressure head, P, can be calculated using $P=\rho_{LH2}\times g\times h$, where $\rho_{LH2}$ is a density of liquid hydrogen, g is acceleration of gravity (gravity constant), and h is a height difference between upstream and downstream points.

Figure 9:
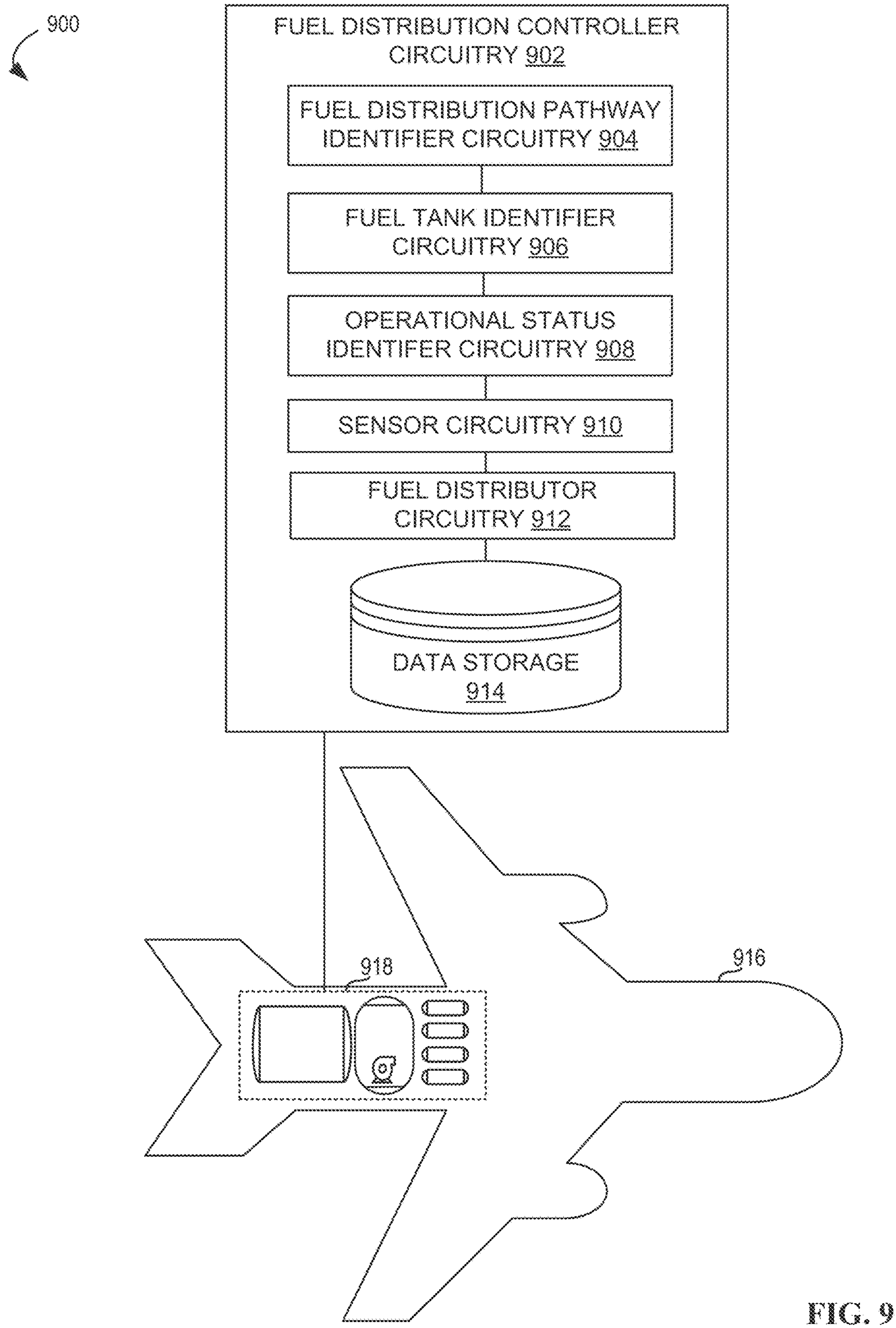
FIG. 9 is a block diagram of an example fuel distribution controller circuitry that may be incorporated into a fuel system developed in accordance with teachings of this disclosure.

FIG. 9 is a block diagram 900 of an example fuel distribution controller circuitry 902 that may be incorporated into a fuel system developed in accordance with teachings of this disclosure. In the example of FIG. 9, the fuel distribution controller circuitry 902 includes fuel distribution pathway identifier circuitry 904, fuel tank identifier circuitry 906, operational status identifier circuitry 908, sensor circuitry 910, fuel distributor circuitry 912, and/or data storage 914. In the example of FIG. 9, the fuel distribution controller circuitry 902 is shown to be in communication with aircraft 916, which includes fuel storage component(s) 918. The fuel storage component(s) 918 can include any of the fuel storage systems described herein, including, but not limited to, the CNG tank bank 202 of FIG. 2, the GH2 tank bank 208 of FIG. 2, the LH2 tank 222 of FIG. 2, the LH2 tank 302 of FIG. 3, the LH2 tank 402 of FIG. 4, and/or the secondary LH2 tank 406 of FIG. 4.

The fuel distribution pathway identifier circuitry 904 identifies fuel distribution pathway(s) on the aircraft 916. For example, as shown in connection with FIGS. 2-6, there are multiple fuel distribution pathways that can be positioned on the aircraft 916. In some examples, the fuel distribution systems can include a compressed natural gas delivery assembly (e.g., compressed natural gas delivery assembly 203), a gaseous hydrogen delivery assembly (e.g., gaseous hydrogen delivery assembly 207), and/or a liquid hydrogen delivery assembly (e.g., liquid hydrogen delivery assembly 227, 301, 401). As such, the fuel distribution pathway identifier circuitry 904 can be used to identify whether the fuel delivery assemblies are operational.

The fuel tank identifier circuitry 906 identifies fuel tank(s) available on the aircraft 916 and/or the fuel tank status (e.g., fuel level(s)). In some examples, the fuel tank identifier circuitry 906 identifies the presence of a CNG tank bank, a GH2 tank bank, and/or an LH2 tank bank onboard the aircraft 916. In some examples, the fuel tank identifier circuitry 906 identifies a specific fuel level (e.g., amount of gaseous hydrogen gas, amount of liquid hydrogen gas in a primary and/or a secondary tank, amount of compressed natural gas, etc.). Based on the identification(s) of the fuel tank identifier circuitry 906, the fuel distribution controller circuitry 902 can implement the fuel distribution pathway identifier circuitry 904 to determine which fuel distribution pathway is most appropriate for a given system based on the fuel levels.

The operational status identifier circuitry 908 identifies the aircraft 916 operational status. In some examples, the aircraft 916 can be in a stationary phase, a starting engine phase, a cruising phase, and/or a takeoff/climbing phase. Depending on the operational status of the aircraft 916, the fuel distribution pathway can be altered using the fuel distribution controller circuitry 902, as described in connection with FIG. 10. For example, by identifying the available fuel distribution pathways using the fuel distribution pathway identifier circuitry 904, obtaining the fuel tank status and/or fill levels using the fuel tank identifier circuitry 906, and confirming the operational status of the aircraft 916 using the operational status identifier circuitry 908, the fuel distribution controller circuitry 902 determines the appropriate fuel distribution assemblies to utilize, as described in connection with FIG. 10.

The sensor circuitry 910 uses sensor(s) positioned throughout the fuel distribution pathway(s) to determine data indicative of the fuel distribution assembly performance. For example, the sensor circuitry 910 can be in communication with one or more sensor(s) for sensing various operability parameters of the fuel distribution arrangement 200, 300, 400, 500 and/or 600 of FIGS. 2, 3, 4, 5, 6. For example, the sensor circuitry 910 can receive data from sensor 201 (e.g., configured to sense data indicative of the CNG tank bank 202,) the sensor 209 (e.g., configured to sense data indicative of the GH2 tank bank 208), sensor 221 (e.g., configured to sense data indicative of the LH2 tank 222), sensor 231 (e.g., configured to sense data indicative of a flow of gaseous hydrogen fuel from the GH2 tank bank 208 and/or a flow of compressed natural gas from the CNG tank bank 202), sensor 260 (e.g., configured to sense data indicative of a flow of liquid hydrogen fuel through the pump 230), sensor 262 (e.g., configured to sense data indicative of a flow rate and/or phase of the hydrogen fuel downstream of the heat exchanger 236), sensor 264 (e.g., configured sense data indicative of a hydrogen fuel within the buffer tank 245), sensor 306 (e.g., configured to sense data indicative of the LH2 tank 302 and/or the submerged cryogenic pump 304), sensor 404 (e.g., configured to sense data indicative of the LH2 tank 402), and/or sensor 412 (e.g., configured to sense data indicative of the secondary LH2 tank 406 and/or the submerged cryogenic pump 408).

The fuel distributor circuitry 912 initiates fuel distribution from one or more fuel distribution assemblies on aircraft 916. For example, based on the identification of available fuel distribution pathways, the status of the fuel tanks on the aircraft 916, and/or the operational status of the aircraft 916, the fuel distributor circuitry 912 can be used to initiate the delivery of fuel (e.g., liquid hydrogen, gaseous hydrogen, compressed natural gas) to the combustor of aircraft 916 (e.g., combustor 254 of engine 252). In some examples, the fuel distributor circuitry 912 monitors the fuel distribution throughout the fuel distribution assemblies (e.g., compressed natural gas delivery assembly 203, gaseous hydrogen delivery assembly 207, liquid hydrogen delivery assembly 227, 301, 401) using sensor circuitry 910. For example, the fuel distribution controller circuitry 902 adjusts the three dynamic regulator(s) 206, 215, 247 of FIG. 2 and/or the operating speed of the LH2 pump motor 232 to obtain the required flow rate by the aircraft.

The data storage 914 can be used to store any information associated with the fuel distribution pathway identifier circuitry 904, fuel tank identifier circuitry 906, operational status identifier circuitry 908, sensor circuitry 910, and/or fuel distributor circuitry 912. The example data storage 914 of the illustrated example of FIG. 9 can be implemented by any memory, storage device and/or storage disc for storing data such as flash memory, magnetic media, optical media, etc. Furthermore, the data stored in the example data storage 914 can be in any data format such as binary data, comma delimited data, tab delimited data, structured query language (SQL) structures, image data, etc.

While an example manner of implementing the fuel distribution controller circuitry 902 is illustrated in FIG. 9, one or more of the elements, processes, and/or devices illustrated in FIG. 9 may be combined, divided, re-arranged, omitted, eliminated, and/or implemented in any other way. Further, the example fuel distribution pathway identifier circuitry 904, the fuel tank identifier circuitry 906, the operational status identifier circuitry 908, the sensor circuitry 910, the fuel distributor circuitry 912, and/or, more generally, the example fuel distribution controller circuitry 902 of FIG. 9, may be implemented by hardware, software, firmware, and/or any combination of hardware, software, and/or firmware. Thus, for example, any of the fuel distribution pathway identifier circuitry 904, the fuel tank identifier circuitry 906, the operational status identifier circuitry 908, the sensor circuitry 910, the fuel distributor circuitry 912, and/or, more generally, the example fuel distribution controller circuitry 902 of FIG. 9 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the fuel distribution pathway identifier circuitry 904, the fuel tank identifier circuitry 906, the operational status identifier circuitry 908, the sensor circuitry 910, the fuel distributor circuitry 912, and/or, more generally, the example fuel distribution controller circuitry 902 of FIG. 9 is/are hereby expressly defined to include a non-transitory computer readable storage device or storage disk such as a memory, a digital versatile disk (DVD), a compact disk (CD), a Blu-ray disk, etc., including the software and/or firmware. Further still, the example fuel distribution controller circuitry 902 of FIG. 9 may include one or more elements, processes, and/or devices in addition to, or instead of, those illustrated in FIG. 9, and/or may include more than one of any or all of the illustrated elements, processes and devices.

Figure 10:
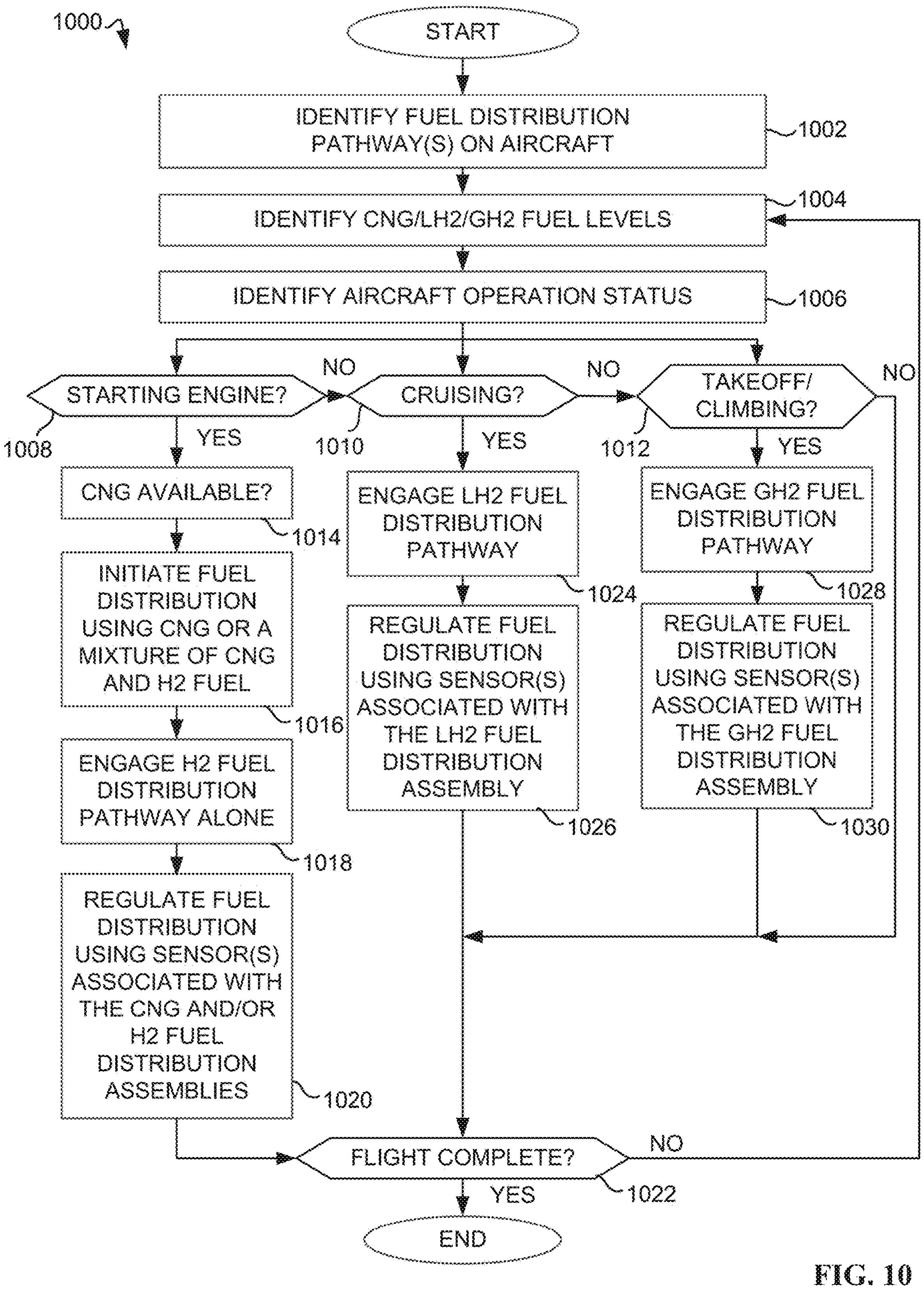
FIG. 10 is a flowchart representative of example machine readable instructions that may be executed by example processor circuitry to implement the fuel distribution controller circuitry of FIG. 9.

A flowchart representative of example hardware logic circuitry, machine readable instructions, hardware implemented state machines, and/or any combination thereof for implementing the fuel distribution controller circuitry 902 of FIG. 9 is shown in FIG. 10. The machine readable instructions may be one or more executable programs or portion(s) of an executable program for execution by processor circuitry, such as the processor circuitry 1112 shown in the example processor platform 1100 discussed below in connection with FIG. 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing fuel distribution controller circuitry 902 of FIG. 9 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 10 is a flowchart representative of example machine readable instructions 1000 that may be executed by example processor circuitry 1112 to implement the fuel distribution controller circuitry of FIG. 9. In the example of FIG. 10, the fuel distribution pathway identifier circuitry 904 identifies available fuel distribution pathway(s) on aircraft 916 of FIG. 9 (block 1002). For example, the fuel distribution pathway identifier circuitry 904 determines the type(s) of fuel distribution assemblies present on the aircraft 916 (e.g., compressed natural gas distribution assembly, gaseous hydrogen distribution assembly, liquid hydrogen distribution assembly, etc.). As described in connection with FIGS. 2-6, fuel can be routed to the combustor from multiple sources (e.g., CNG tank bank, LH2 tank, GH2 tank bank, etc.). In some examples, the fuel tank identifier circuitry 906 identifies the available fuel tank(s) on the aircraft 916 and determines the fuel level(s) in the available fuel tanks (e.g., CNG, LH2, GH2 fuel levels) (block 1004). In some examples, the operational status identifier circuitry 908 identifies aircraft 916 operational status (e.g., takeoff, cruising, etc.) (block 1006). Based on the operational status of the aircraft 916, the fuel tank level(s), and/or the available fuel distribution pathway(s), the fuel distribution controller circuitry 902 identifies the most appropriate fuel distribution pathway. For example, the fuel distribution controller circuitry 902 identifies the type of fuel distribution assembly to engage based on the aircraft being in a particular operational phase, including an engine starting phase, a cruising phase, and/or a takeoff/climbing phase. The fuel distribution status and/or progress can be monitored using the sensor circuitry 910. For example, if the operational status identifier circuitry 908 determines that the aircraft needs to start the engine (block 1008), the fuel tank identifier circuitry 906 can determine whether compressed natural gas (CNG) is available (block 1014).

As previously described, the fuel flow rate for an aircraft varies significantly during flight. For example, maximum fuel flow rate is required during takeoff, which is approximately four times the fuel flow rate at cruise altitude. Improved fuel distribution incorporating multiple fuel distribution systems to power an aircraft and/or turbine engine permits increased engine efficiency. For example, the CNG tank bank 202 can be used to introduce natural gas during engine startup without reliance on only liquid or gaseous hydrogen-based fuel. In some examples, the GH2 tank bank 208 can be used to provide gaseous hydrogen during takeoff and climbing, while the LH2 tank 222 can be switched to during a cruising phase of flight. As such, the fuel distributor circuitry 912 initiates fuel distribution using CNG and/or a mixture of CNG and hydrogen-based fuel (block 1016), followed by a transition to H2-based fuel distribution alone (block 1018). The fuel distribution controller circuitry 902 regulates fuel distribution using sensor(s) associated with the CNG and/or H2 fuel distribution assemblies (block 1020). If the aircraft 916 is in a cruising phase (block 1010), the fuel distributor circuitry 912 engages the LH2 fuel distribution pathway (block 1024). In some examples, the fuel distribution controller circuitry 902 regulates LH2 fuel distribution via the sensor circuitry 910 using sensor(s) associated with the LH2 fuel distribution assembly (block 1026). For example, the GH2 tank bank 208 can be used to provide gaseous hydrogen during takeoff and climbing, while the LH2 tank 222 can be switched to during a cruising phase of flight so that fuel consumption needs can vary based on a particular phase of the flight (e.g., taxing, takeoff, cruising, etc.). Cruising is the longest operation during a given flight, with much lower fuel consumption (e.g., between about 25% and about 40% of the maximum hydrogen fuel flow), while the takeoff phase (block 1012) requires the highest consumption of fuel (e.g., about 100% of a maximum hydrogen fuel flow for a given flight path). As such, during takeoff/climbing, the fuel distributor circuitry 912 initiates fuel distribution using the GH2 fuel distribution pathway (block 1028). The fuel distribution controller circuitry 902 regulates GH2 fuel distribution via the sensor circuitry 910 using sensor(s) associated with the GH2 fuel distribution assembly (block 1030). The fuel distribution controller circuitry 902 can continue to monitor the operation phase of the aircraft 916 until the flight is complete (block 1022). The CNG tank bank, the GH2 tank bank, and/or the LH2 tank arrangements shown in FIGS. 2-7 permit varying arrangement(s) of fuel distribution based on a given operation being performed by the aircraft (e.g., taxing, takeoff, cruising, etc.) to match the necessary fuel flows.

Figure 11:
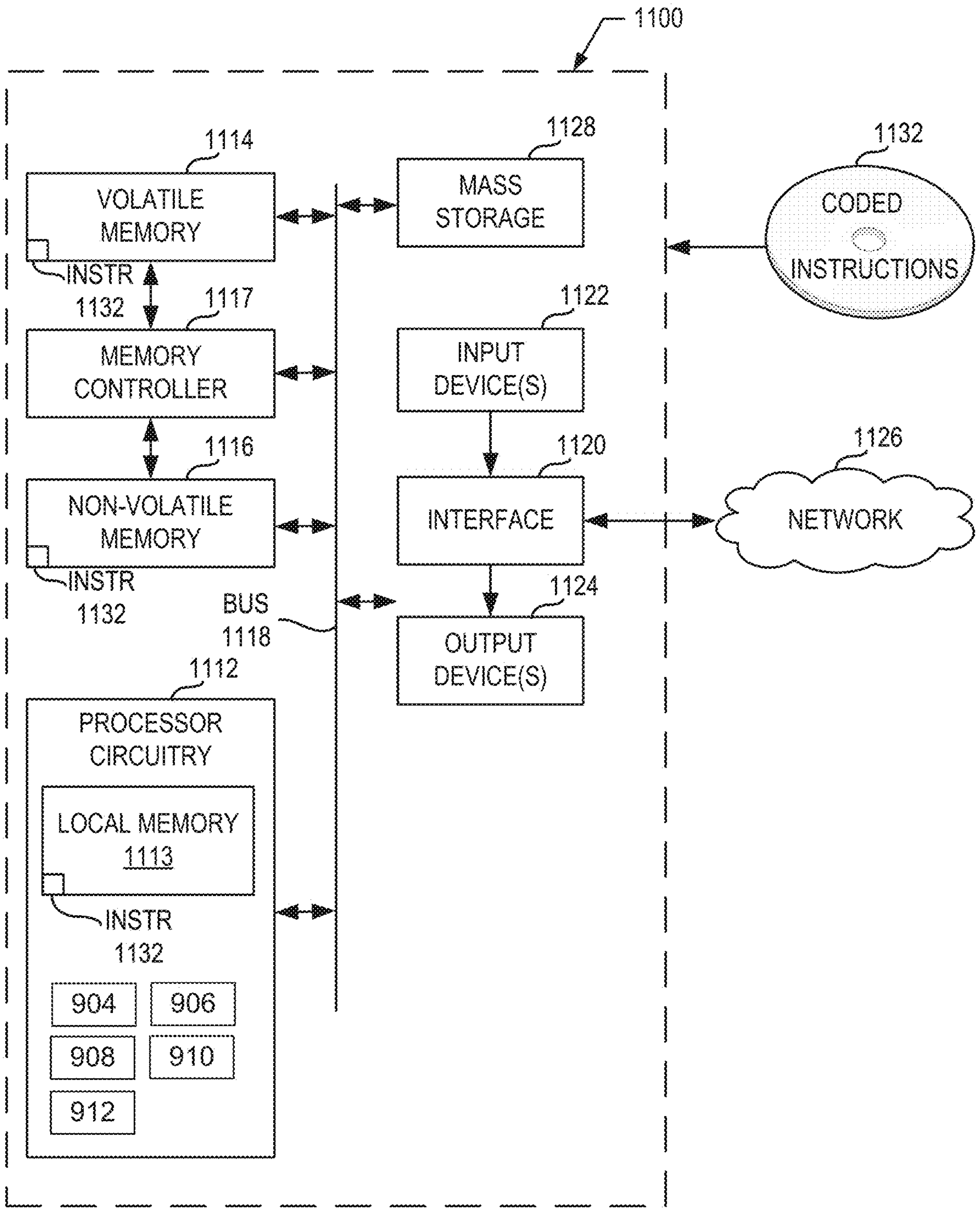
FIG. 11 is a block diagram of an example processing platform including processor circuitry structured to execute the example machine readable instructions of FIG. 10 to implement the fuel distribution controller circuitry of FIG. 9.

FIG. 11 is a block diagram of an example processor platform 1100 including processor circuitry structured to execute the example machine readable instructions of FIG. 10 to implement the fuel distribution controller circuitry of FIG. 9. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the fuel distribution pathway identifier circuitry 904, the fuel tank identifier circuitry 906, the operational status identifier circuitry 908, the sensor circuitry 910, and/or the fuel distributor circuitry 912.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIG. 10, may be stored in the mass storage device 1128, in the volatile memory 1114, in the non-volatile memory 1116, and/or on a removable non-transitory computer readable storage medium such as a CD or DVD.

From the foregoing, it will be appreciated that example systems, methods, apparatus, and articles of manufacture have been disclosed that introduce hydrogen-based fuel distribution systems, including hydrogel fuel distribution systems that use a submerged pump and compressed natural gas. For example, compressed natural gas (CNG), liquid hydrogen (LH2) and/or gaseous hydrogen (GH2) storage can be combined for use during various flight operations. For example, a CNG tank can be used to enable startup and operation with natural gas and/or a natural gas/hydrogen blend. In the examples disclosed herein, the fuel distribution system can include a submerged pump located in a primary LH2 tank and/or a secondary LH2 tank. For example, a low pressure submerged pump can be used in a main LH2 tank to provide a net positive suction head (NPSH) to a primary pump, while a high pressure submerged pump can be used in a secondary LH2 tank as the primary pump. Such a configuration can permit simpler servicing and/or replacement of the submerged pump(s) in the secondary LH2 tank without disturbing the primary LH2 tank.

Example methods, apparatus, systems, and articles of manufacture for hydrogel fuel distribution systems that use a submerged pump and compressed natural gas are disclosed herein. Further examples and combinations thereof include the following:

Example 1 includes a fuel distribution system, comprising a gaseous hydrogen fuel tank for holding a first portion of hydrogen fuel in a gaseous phase as part of a gaseous hydrogen delivery assembly, and a liquid hydrogen fuel tank for holding a second portion of hydrogen fuel in a liquid phase as part of a liquid hydrogen delivery assembly, the liquid hydrogen fuel tank including a primary tank and a secondary tank, the secondary tank including a submerged pump, wherein the gaseous hydrogen fuel tank and the liquid hydrogen fuel tank are in a parallel arrangement.

Example 2 includes the fuel distribution system of any preceding clause, further including a compressed natural gas tank for holding compressed natural gas as part of a compressed natural gas delivery assembly.

Example 3 includes the fuel distribution system of any preceding clause, wherein the gaseous hydrogen delivery assembly, the compressed natural gas delivery assembly, and the liquid hydrogen delivery assembly are in a parallel arrangement.

Example 4 includes the fuel distribution system of any preceding clause, wherein the submerged pump pumps, in the liquid phase, the second portion of hydrogen fuel through the liquid hydrogen delivery assembly.

Example 5 includes the fuel distribution system of any preceding clause, further including a regulator assembly in fluid communication with both the liquid hydrogen delivery assembly and the gaseous hydrogen delivery assembly.

Example 6 includes the fuel distribution system of any preceding clause, wherein the liquid hydrogen delivery assembly includes a heat exchanger located downstream of the submerged pump for converting the first portion of hydrogen fuel from the liquid phase to the gaseous phase.

Example 7 includes a fuel distribution system, comprising a compressed natural gas tank for holding a first portion of fuel as part of a compressed natural gas delivery assembly, and a liquid hydrogen fuel tank for holding a second portion of fuel in a liquid phase as part of a liquid hydrogen delivery assembly, the liquid hydrogen fuel tank including a submerged pump, wherein the compressed natural gas tank and the liquid hydrogen fuel tank are in a parallel arrangement.

Example 8 includes the fuel distribution system of any preceding clause, further including a gaseous hydrogen fuel tank for holding a third portion of hydrogen fuel in a gaseous phase as part of a gaseous hydrogen delivery assembly.

Example 9 includes the fuel distribution system of any preceding clause, wherein the gaseous hydrogen delivery assembly, the compressed natural gas delivery assembly, and the liquid hydrogen delivery assembly are in a parallel arrangement.

Example 10 includes the fuel distribution system of any preceding clause, further including a regulator assembly in fluid communication with both the liquid hydrogen delivery assembly and the gaseous hydrogen delivery assembly.

Example 11 includes the fuel distribution system of any preceding clause, wherein the submerged pump pumps, in the liquid phase, hydrogen fuel through the liquid hydrogen delivery assembly.

Example 12 includes the fuel distribution system of any preceding clause, wherein the liquid hydrogen delivery assembly includes a heat exchanger located downstream of the submerged pump for converting hydrogen fuel from the liquid phase to a gaseous phase.

Example 13 includes an apparatus for fuel distribution in a vehicle, the apparatus comprising at least one memory, instructions in the apparatus, and processor circuitry to execute the instructions to identify a fuel distribution pathway, the fuel distribution pathway including a compressed natural gas delivery assembly, a liquid hydrogen fuel delivery assembly, or a gaseous hydrogen fuel delivery assembly, identify an operational status of the vehicle, the operational status including an amount of energy to propel the vehicle, and adjust the fuel distribution pathway based on the operational status of the vehicle.

Example 14 includes the apparatus of any preceding clause, wherein the liquid hydrogen fuel delivery assembly includes a liquid hydrogen tank with a submerged pump.

Example 15 includes the apparatus of any preceding clause, wherein the liquid hydrogen fuel delivery assembly includes a primary liquid hydrogen tank and a secondary liquid hydrogen tank, the secondary liquid hydrogen tank including a submerged pump.

Example 16 includes the apparatus of any preceding clause, wherein the operational status of the vehicle is an operational status of an aircraft, the operational status of the aircraft including a cruising phase, a takeoff phase, or an engine start-up phase.

Example 17 includes the apparatus of any preceding clause, wherein the processor circuitry is to engage the compressed natural gas delivery assembly when the operational status is the engine start-up phase.

Example 18 includes the apparatus of any preceding clause, wherein the processor circuitry is to engage the liquid hydrogen fuel delivery assembly when the operational status is the cruising phase.

Example 19 includes the apparatus of any preceding clause, wherein the processor circuitry is to engage the gaseous hydrogen fuel delivery assembly when the operational status is the takeoff phase or a climbing phase.

Example 20 includes the apparatus of any preceding clause, wherein the processor circuitry is to identify a fuel tank status using one or more sensors, the one or more sensors positioned within the compressed natural gas delivery assembly, the liquid hydrogen fuel delivery assembly, or the gaseous hydrogen fuel delivery assembly.

Example 21 includes a method of fuel distribution, comprising holding a first portion of hydrogen fuel in a gaseous phase as part of a gaseous hydrogen delivery assembly, and holding a second portion of hydrogen fuel in a liquid phase as part of a liquid hydrogen delivery assembly, the liquid hydrogen delivery assembly including a primary tank and a secondary tank, the secondary tank including a submerged pump.

Example 22 includes the method of any preceding clause, further including holding compressed natural gas as part of a compressed natural gas delivery assembly.

Example 23 includes the method of any preceding clause, wherein the submerged pump pumps, in the liquid phase, the second portion of hydrogen fuel through the liquid hydrogen delivery assembly.

Example 24 includes the method of any preceding clause, wherein a regulator assembly is in fluid communication with both the liquid hydrogen delivery assembly and the gaseous hydrogen delivery assembly.

Example 25 includes the method of any preceding clause, wherein the liquid hydrogen delivery assembly includes a heat exchanger located downstream of the submerged pump for converting the first portion of hydrogen fuel from the liquid phase to the gaseous phase.

Example 26 includes a method of fuel distribution system, comprising holding a first portion of fuel as part of a compressed natural gas delivery assembly, and holding a second portion of fuel in a liquid phase as part of a liquid hydrogen delivery assembly, the liquid hydrogen delivery assembly including a liquid hydrogen fuel tank with a submerged pump.

Example 27 includes the method of any preceding clause, further including holding a third portion of hydrogen fuel in a gaseous phase as part of a gaseous hydrogen delivery assembly.

Example 28 includes the method of any preceding clause, further including a regulator assembly in fluid communication with both the liquid hydrogen delivery assembly and the gaseous hydrogen delivery assembly.

Example 29 includes the method of any preceding clause, wherein the submerged pump pumps, in the liquid phase, hydrogen fuel through the liquid hydrogen delivery assembly.

Example 30 includes the method of any preceding clause, wherein the liquid hydrogen delivery assembly includes a heat exchanger located downstream of the submerged pump for converting hydrogen fuel from the liquid phase to a gaseous phase.

Example 31 includes an apparatus for fuel distribution in a vehicle, the apparatus comprising programming instructions stored on a memory for carrying out a method of fluid distribution to identify a fuel distribution pathway, the fuel distribution pathway including a compressed natural gas delivery assembly, a liquid hydrogen fuel delivery assembly, or a gaseous hydrogen fuel delivery assembly, identify an operational status of the vehicle, the operational status including an amount of energy to propel the vehicle, and adjust the fuel distribution pathway based on the operational status of the vehicle.

Example 32 includes the apparatus of any preceding clause, wherein the liquid hydrogen fuel delivery assembly includes a liquid hydrogen tank with a submerged pump.

Example 33 includes the apparatus of any preceding clause, wherein the liquid hydrogen fuel delivery assembly includes a primary liquid hydrogen tank and a secondary liquid hydrogen tank, the secondary liquid hydrogen tank including a submerged pump.

Example 34 includes the apparatus of any preceding clause, wherein the operational status of the vehicle is an operational status of an aircraft, the operational status of the aircraft including a cruising phase, a takeoff phase, or an engine start-up phase.

Example 35 includes the apparatus of any preceding clause, wherein the programming instructions are to engage the compressed natural gas delivery assembly when the operational status is the engine start-up phase.

Example 36 includes the apparatus of any preceding clause, wherein the programming instructions are to engage the liquid hydrogen fuel delivery assembly when the operational status is the cruising phase.

Example 37 includes the apparatus of any preceding clause, wherein the programming instructions are to engage the gaseous hydrogen fuel delivery assembly when the operational status is the takeoff phase or a climbing phase.

Example 38 includes the apparatus of any preceding clause, wherein the programming instructions are to identify a fuel tank status using one or more sensors, the one or more sensors positioned within the compressed natural gas delivery assembly, the liquid hydrogen fuel delivery assembly, or the gaseous hydrogen fuel delivery assembly.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A fuel distribution system, comprising:

a gaseous hydrogen fuel tank for holding a first portion of hydrogen fuel in a gaseous phase as part of a gaseous hydrogen delivery assembly; and a liquid hydrogen fuel tank for holding a second portion of hydrogen fuel in a liquid phase as part of a liquid hydrogen delivery assembly, the liquid hydrogen fuel tank including a primary tank and a secondary tank, the secondary tank including a submerged pump, wherein the gaseous hydrogen fuel tank is in a parallel arrangement with at least one of the primary tank or the secondary tank, wherein a first gaseous hydrogen buffer tank is positioned downstream of the primary tank and a second gaseous hydrogen buffer tank is positioned downstream of the secondary tank; wherein the second gaseous hydrogen buffer tank is positioned downstream of a sensor configured to identify a flow of compressed natural gas from a compressed natural gas tank.

2. The fuel distribution system of claim 1, wherein the compressed natural gas tank holds compressed natural gas as part of a compressed natural gas delivery assembly.

3. The fuel distribution system of claim 2, wherein the gaseous hydrogen delivery assembly, the compressed natural gas delivery assembly, and the liquid hydrogen delivery assembly are in a parallel arrangement.

4. The fuel distribution system of claim 1, wherein the submerged pump pumps, in the liquid phase, the second portion of hydrogen fuel through the liquid hydrogen delivery assembly.

5. The fuel distribution system of claim 1, further including a regulator assembly in fluid communication with both the liquid hydrogen delivery assembly and the gaseous hydrogen delivery assembly.

6. The fuel distribution system of claim 1, wherein the liquid hydrogen delivery assembly includes a heat exchanger located downstream of the submerged pump for converting the first portion of hydrogen fuel from the liquid phase to the gaseous phase.

7. The fuel distribution system of claim 1, wherein the submerged pump is used as a primary pump.

8. The fuel distribution system of claim 1, further including a sensor configured to identify sensor data associated with the submerged pump.

9. The fuel distribution system of claim 8, wherein the sensor data includes an internal temperature or an internal pressure.

10. The fuel distribution system of claim 1, further including a three-way regulator valve to receive hydrogen fuel originating from the liquid hydrogen fuel tank via the submerged pump.

11. The fuel distribution system of claim 1, wherein at least one of the first gaseous hydrogen buffer tank or the second gaseous hydrogen buffer tank is positioned downstream of a motor for engaging the submerged pump.

12. A fuel distribution system, comprising:

a compressed natural gas tank for holding a first portion of fuel as part of a compressed natural gas delivery assembly; and a liquid hydrogen fuel tank for holding a second portion of fuel in a liquid phase as part of a liquid hydrogen delivery assembly, the liquid hydrogen fuel tank including a primary tank and a secondary tank, the secondary tank including a submerged pump, wherein the compressed natural gas tank and the liquid hydrogen fuel tank are in a parallel arrangement, wherein a first gaseous hydrogen buffer tank is positioned downstream of the primary tank and a second gaseous hydrogen buffer tank is positioned downstream of the secondary tank; wherein the second gaseous hydrogen buffer tank is positioned downstream of a sensor configured to identify a flow of compressed natural gas from the compressed natural gas tank.

13. The fuel distribution system of claim 12, further including a gaseous hydrogen fuel tank for holding hydrogen fuel in a gaseous phase as part of a gaseous hydrogen delivery assembly.

14. The fuel distribution system of claim 13, wherein the gaseous hydrogen delivery assembly, the compressed natural gas delivery assembly, and the liquid hydrogen delivery assembly are in a parallel arrangement.

15. The fuel distribution system of claim 13, further including a regulator assembly in fluid communication with both the liquid hydrogen delivery assembly and the gaseous hydrogen delivery assembly.

16. The fuel distribution system of claim 12, wherein the submerged pump pumps, in the liquid phase, hydrogen fuel through the liquid hydrogen delivery assembly.

17. The fuel distribution system of claim 12, wherein the liquid hydrogen delivery assembly includes a heat exchanger located downstream of the submerged pump for converting hydrogen fuel from the liquid phase to a gaseous phase.

* * * * *